(12) United States Patent
Bingham et al.

(10) Patent No.: US 12,397,453 B2
(45) Date of Patent: Aug. 26, 2025

(54) SENSORIZED ROBOTIC GRIPPING DEVICE

(71) Applicant: Google LLC, Mountain View, CA (US)

(72) Inventors: Jeffrey Bingham, Sunnyvale, CA (US); Taylor Alexander, Mountain View, CA (US); Bianca Homberg, Mountain View, CA (US); Joseph DelPreto, Los Altos, CA (US); Alex Shafer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/631,636

(22) Filed: Apr. 10, 2024

(65) Prior Publication Data

US 2024/0253253 A1 Aug. 1, 2024

Related U.S. Application Data

(63) Continuation of application No. 17/857,443, filed on Jul. 5, 2022, now Pat. No. 11,975,446, which is a
(Continued)

(51) Int. Cl.
*B25J 15/12* (2006.01)
*B25J 9/10* (2006.01)
(Continued)

(52) U.S. Cl.
CPC ........... *B25J 19/023* (2013.01); *B25J 9/1035* (2013.01); *B25J 13/085* (2013.01); *B25J 13/086* (2013.01);
(Continued)

(58) Field of Classification Search
CPC .... B25J 13/086; B25J 9/1035; B25J 15/0004; B25J 13/085; B25J 9/1612; B25J 15/0213;
(Continued)

(56) References Cited

U.S. PATENT DOCUMENTS 4,367,891 A 1/1983 Wauer et al.
4,740,025 A 4/1988 Nelson
(Continued)

FOREIGN PATENT DOCUMENTS

CN 107097227 8/2017

OTHER PUBLICATIONS

Tascillo et al., Neurofuzzy grasp control of a robotic hand, 1993, IEEE, p. 507-516 (Year: 1993).*
(Continued)

*Primary Examiner* — McDieunel Marc
(74) *Attorney, Agent, or Firm* — McDonnell Boehnen Hulbert & Berghoff LLP

(57) ABSTRACT

A robotic gripping device is provided. The robotic gripping device includes a palm and a plurality of digits coupled to the palm. The robotic gripping device also includes a time-of-flight sensor arranged on the palm such that the time-of-flight sensor is configured to generate time-of-flight distance data in a direction between the plurality of digits. The robotic gripping device additionally includes an infrared camera, including an infrared illumination source, where the infrared camera is arranged on the palm such that the infrared camera is configured to generate grayscale image data in the direction between the plurality of digits.

20 Claims, 17 Drawing Sheets

Related U.S. Application Data continuation of application No. 16/867,720, filed on May 6, 2020, now Pat. No. 11,407,125, which is a continuation of application No. 15/839,045, filed on Dec. 12, 2017, now Pat. No. 10,682,774.

(51) Int. Cl.
  *B25J 13/08* (2006.01)
  *B25J 15/00* (2006.01)
  *B25J 15/02* (2006.01)
  *B25J 19/02* (2006.01)

(52) U.S. Cl.
  CPC ....... *B25J 15/0004* (2013.01); *B25J 15/0213* (2013.01); *B25J 15/12* (2013.01)

(58) Field of Classification Search
  CPC ........ B25J 15/12; B25J 9/1697; B25J 19/023; G05B 2219/39527; G05B 2219/39531; G05B 2219/40594; G05B 2219/40613; G05B 2219/40532; G05B 2219/37425
  See application file for complete search history.

(56) References Cited

U.S. PATENT DOCUMENTS

| | | | |
|---|---|---|---|
| 4,921,293 A | 5/1990 | Ruoff et al. | |
| 4,957,320 A | 9/1990 | Ulrich | |
| 4,980,626 A | 12/1990 | Hess et al. | |
| 5,108,140 A | 4/1992 | Bartholet | |
| 5,172,951 A | 12/1992 | Jacobsen et al. | |
| 5,501,498 A | 3/1996 | Ulrich | |
| 5,762,390 A | 6/1998 | Gosselin et al. | |
| 5,967,580 A | 10/1999 | Rosheim | |
| 6,517,132 B2 | 2/2003 | Matsuda et al. | |
| 6,721,444 B1 | 4/2004 | Gu et al. | |
| 6,817,641 B1 | 11/2004 | Singleton, Jr. | |
| 7,168,748 B2 | 1/2007 | Townsend et al. | |
| 7,289,884 B1 | 10/2007 | Takahashi et al. | |
| 7,340,100 B2 | 3/2008 | Higaki et al. | |
| 7,549,688 B2 | 6/2009 | Hayakawa et al. | |
| 8,280,837 B2 | 10/2012 | Platt et al. | |
| 8,297,672 B2 | 10/2012 | Kim et al. | |
| 8,346,393 B2 | 1/2013 | Kim et al. | |
| 8,364,314 B2 | 1/2013 | Abdallah et al. | |
| 8,463,434 B2 | 6/2013 | Takahashi | |
| 8,483,882 B2 | 7/2013 | Abdallah et al. | |
| 8,504,198 B2 | 8/2013 | Takahashi et al. | |
| 9,102,055 B1 | 8/2015 | Konolige et al. | |
| 9,519,971 B2 | 12/2016 | Kotake et al. | |
| 9,630,320 B1 | 4/2017 | Konolige et al. | |
| 9,827,670 B1 | 11/2017 | Strauss | |
| 9,927,222 B2 | 3/2018 | Suzuki et al. | |
| 10,242,438 B2 | 3/2019 | Watanabe | |
| 10,354,139 B1 | 7/2019 | Li et al. | |
| 10,471,591 B1* | 11/2019 | Hinkle | B25J 9/1612 |
| 10,682,774 B2 | 6/2020 | Bingham et al. | |
| 10,792,809 B2 | 10/2020 | Bingham et al. | |
| 10,913,151 B1 | 2/2021 | Hinkle | |
| 10,967,507 B2 | 4/2021 | Homberg et al. | |
| 11,407,125 B2 | 8/2022 | Bingham et al. | |
| 2004/0028260 A1 | 2/2004 | Higaki et al. | |
| 2004/0103740 A1 | 6/2004 | Townsend et al. | |
| 2005/0125099 A1 | 6/2005 | Mikami et al. | |
| 2006/0012198 A1 | 1/2006 | Hager et al. | |
| 2006/0128316 A1 | 6/2006 | Moller et al. | |
| 2006/0195226 A1 | 8/2006 | Matsukawa et al. | |
| 2007/0010913 A1 | 1/2007 | Miyamoto et al. | |
| 2007/0018470 A1 | 1/2007 | Hayakawa et al. | |
| 2007/0219668 A1 | 9/2007 | Takahashi et al. | |
| 2007/0236162 A1 | 10/2007 | Kawabuchi et al. | |
| 2008/0077361 A1 | 3/2008 | Boyd et al. | |
| 2008/0114491 A1 | 5/2008 | Takahashi | |
| 2008/0253612 A1 | 10/2008 | Reyier et al. | |
| 2009/0069942 A1 | 3/2009 | Takahashi | |
| 2009/0285664 A1 | 11/2009 | Kim et al. | |
| 2009/0302626 A1 | 12/2009 | Dollar et al. | |
| 2009/0306825 A1 | 12/2009 | Li et al. | |
| 2010/0011899 A1 | 1/2010 | Kim et al. | |
| 2010/0138039 A1 | 6/2010 | Moon et al. | |
| 2010/0161130 A1 | 6/2010 | Kim et al. | |
| 2010/0179689 A1 | 7/2010 | Lin | |
| 2010/0256814 A1 | 10/2010 | Smith | |
| 2010/0280661 A1 | 11/2010 | Abdallah et al. | |
| 2010/0280663 A1 | 11/2010 | Abdallah et al. | |
| 2011/0067521 A1 | 3/2011 | Linn et al. | |
| 2011/0206274 A1 | 8/2011 | Tateno et al. | |
| 2012/0059517 A1 | 3/2012 | Nomura | |
| 2012/0283875 A1 | 11/2012 | Klumpp et al. | |
| 2012/0306876 A1 | 12/2012 | Shotton et al. | |
| 2013/0114861 A1 | 5/2013 | Takizawa | |
| 2013/0325181 A1 | 12/2013 | Moore | |
| 2013/0343640 A1* | 12/2013 | Buehler | B25J 9/163 382/155 |
| 2014/0277742 A1 | 9/2014 | Wells et al. | |
| 2016/0155235 A1 | 6/2016 | Miyatani et al. | |
| 2017/0036354 A1* | 2/2017 | Chavan Dafle | B25J 15/0253 |
| 2017/0098309 A1 | 4/2017 | Michel | |
| 2017/0252922 A1 | 9/2017 | Levine et al. | |
| 2017/0282380 A1 | 10/2017 | Uetabira | |
| 2017/0320216 A1 | 11/2017 | Strauss | |
| 2018/0080815 A1 | 3/2018 | Nayak | |
| 2018/0193999 A1* | 7/2018 | Jacobsen | B25J 9/1633 |
| 2019/0001489 A1 | 1/2019 | Hudson et al. | |
| 2019/0005374 A1 | 1/2019 | Shankar et al. | |
| 2019/0080668 A1 | 3/2019 | Holenarsipur et al. | |
| 2019/0176326 A1 | 6/2019 | Bingham et al. | |
| 2019/0176348 A1* | 6/2019 | Bingham | B25J 9/1612 |
| 2019/0337152 A1* | 11/2019 | Homberg | B25J 9/1697 |

OTHER PUBLICATIONS

Schmitz et al., Tactile object recognition using deep learning and dropout, 2014, IEEE, p. 1044-1050 (Year: 2014).*

Spiers et al., Single-Grasp Object Classification and Feature Extraction with Simple Robot Hands and Tactile Sensors, 2016, IEEE, p. 207-220 (Year: 2016).*

Pinto et al., Supersizing self-supervision: Learning to grasp from 50K tries and 700 robot hours, 2016, IEEE, p. 3406 (Year: 2016).*

Allan, Jean-François, "Robotics for Distribution Power Lines: Overview of the Last Decade," 2012 2nd International Conference on Applied Robotics for the Power Industry, IEEE, 2012, p. 96-101.

Arms, Robot Components: Robot, Arms, Grippers, Camers, Head, I/O, Screen, http://sdk.rethinkrobotics.com/wiki/Arms, http://sdk.rethinkrobotics.com/wiki/Arms, accessed Nov. 29, 2017, pp. 1-6.

AX-12A Smart Robotic Arm, CrustCrawler Robotics, http://crust.dev.net-craft.com/products/AX12A%20Smart%20Robotic%20Arm/, accessed Nov. 29, 2017, pp. 1-4.

Broadcom, APDS-9500 Imaging Gesture and Proximity Sensor, https://www.broadcom.com/products/optical-sensors/proximity-sensors/apds-9500, accessed Nov. 29, 2017, pp. 1-3.

Chen et al., "Active Illumination for Robot Vision," 2007 IEEE International Conference on Robotics and Automation, Roma, Italy Apr. 10-14, 2007, pp. 411-416.

Dana, Kristin J., "Capturing Computational Appearance—More than meets the eye," IEEE Signal Processing Magazine, Sep. 2016, pp. 70-80.

Fankhauser et al., "Kinect v2 for mobile Robot Navigation: Evaluation and Modeling," IEEE, 2015, 7 pages.

Gonzalez et al., "A 2-D Infrared Instrumentation for Close-Range Finger Position Sensing," IEEE Transactions on Instrumentation and Measurement, 2015, pp. 2708-2719, vol. 64, No. 10.

Green et al., Novel Sensors for Underground Robotics, 8th IEEE Conference on Automation Science and Engineering, IEEE, 2012, pp. 724-728.

Green, Jeremy, "Underground Mining Robot: A CSIR Project," IEEE, 2012, pp. 1-6.

Gunawardane et al., "Invisible Light: Using Infrared for Video Conference Relighting," Proceedings of 2010 IEEE 17th International Conference on Image Processing, IEEE, 2010, pp. 4005-4008.

(56) References Cited

OTHER PUBLICATIONS

InvenSense, MPU-9250 Product Specification Revision 1.1, https://www.invensense.com/wp-content/uploads/2015/02/PS-MPU-9250A-01-v1.1.pdf, Release date: Jun. 20, 2016, pp. 1-42.

Jiang et al., Autonomous Robotic Monitoring of Underground Cable Systems, IEEE, 2005, pp. 673-679.

Kappassov et al., "Semi-Anthropomorphic 3D Printed Multigrasp Hand for Industrial and Service Robots," Proceedings of 2013 IEEE International Conference on Mechatronics and Automation, Aug. 4-7, 2013, pp. 1697-1702.

Kerl et al., Towards Illumination-Invariant 3D Reconstruction using ToF RGB-D Cameras, 2014 Second International Conference on 3D Vision, IEEE, 2014, pp. 39-46.

Kim et al., "New biometrics-acquisition method using time-of-flight depth camera," 2011 IEEE International Conference on Consumer Electronics (ICCE), 2011, pp. 721-722.

Nygårds et al., "Specular Objects in Range Cameras: Reducing Ambiguities by Motion," Proceedings of the 1994 IEEE International Conference on Multisensor Fusion and Integration for Intelligent Systems (MFI'94), Las Vegas, NV, Oct. 2-5, 1994, pp. 320-329.

Pomares et al., "Visual Control of Robots Using Range Images," Sensors, Aug. 2010, pp. 7303-7322, vol. 10.

Raheja et al., "Tracking of Fingertips and Centers of Palm using KINECT," 2011 Third International Conference on Computational Intelligence, Modelling & Simulation, 2011, pp. 248-252.

Saudabayev et al., "Sensors for Robotic Hands: A Survey of State of the Art," IEEE Access, 2015, pp. 1765-1782, vol. 3.

Schechner et al., "Multiplexing for Optimal Lighting," IEEE Transactions on Pattern Analysis and Machine Intelligence, Aug. 2007, pp. 1339-1354, vol. 29, No. 8.

Tian et al., "Stress Relief Robotic System Based on Diffused Illumination Multi-touch Technology," Proceedings of the 2012 IEEE International Conference on Robotics and Biometrics, 2012, pp. 253-258.

VL53L0X, World smallest Time-of-Flight ranging and gesture detection sensor, http://www.st.com/content/ccc/resource/technical/document/datasheet/group3/b2/1e/33/77/c6/92/47/6b/DM00279086/files/DM00279086.pdf/jcr:content/translations/en.DM00279086.pdf, May 2016, pp. 1-40.

VL6180X, Proximity and ambient light sensing (ALS) module, http://www.st.com/content/ccc/resource/technical/document/datasheet/c4/11/28/86/e6/26/44/b3/DM00112632.pdf/files/DM00112632.pdf/jcr:content/translations/en.DM00112632.pdf, Mar. 2016, pp. 1-87.

* cited by examiner

| 600 Complexity of Implementation | | | |
|---|---|---|---|
| | Low | Medium | High |
| Manipulation class 602 | Object occupancy | Grasp shape | Force closure<br><br>Slip detection |
| Sensors 604 | 1D ToF<br><br>Camera (RGB – IR)<br><br>Microphone | Radar<br><br>Tactile finger pads (COTS)<br><br>Camera (DVS)<br><br>IMU in each digit<br><br>3D ToF Camera | Tactile finger pads (custom)<br><br>Force fingernail<br><br>Knuckle 3DoF<br><br>Strain gauges<br><br>Imaging-based tactile sensors |

Figure 6

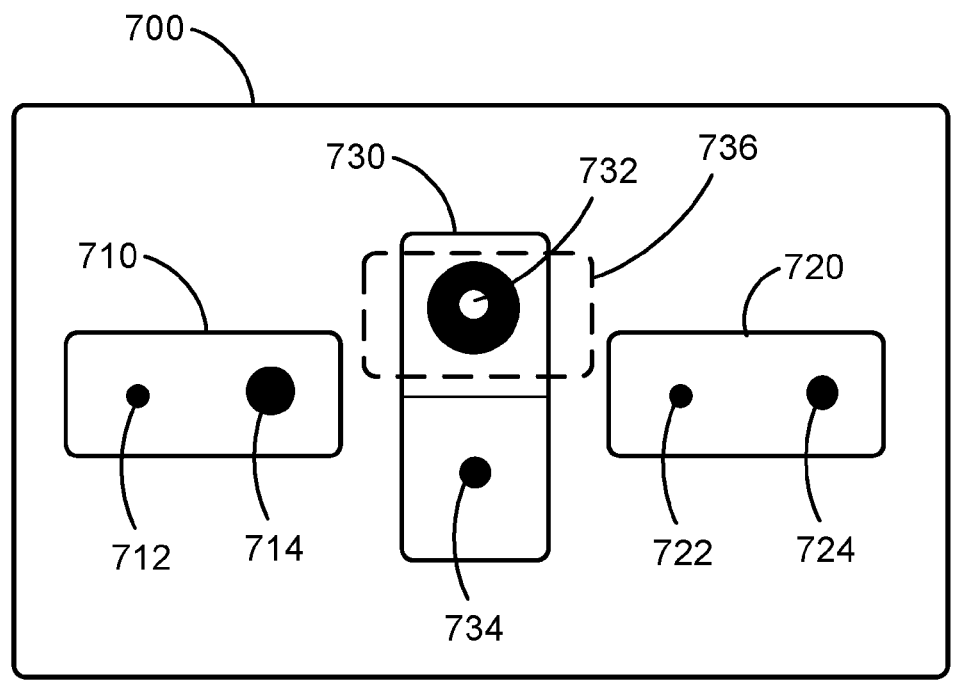
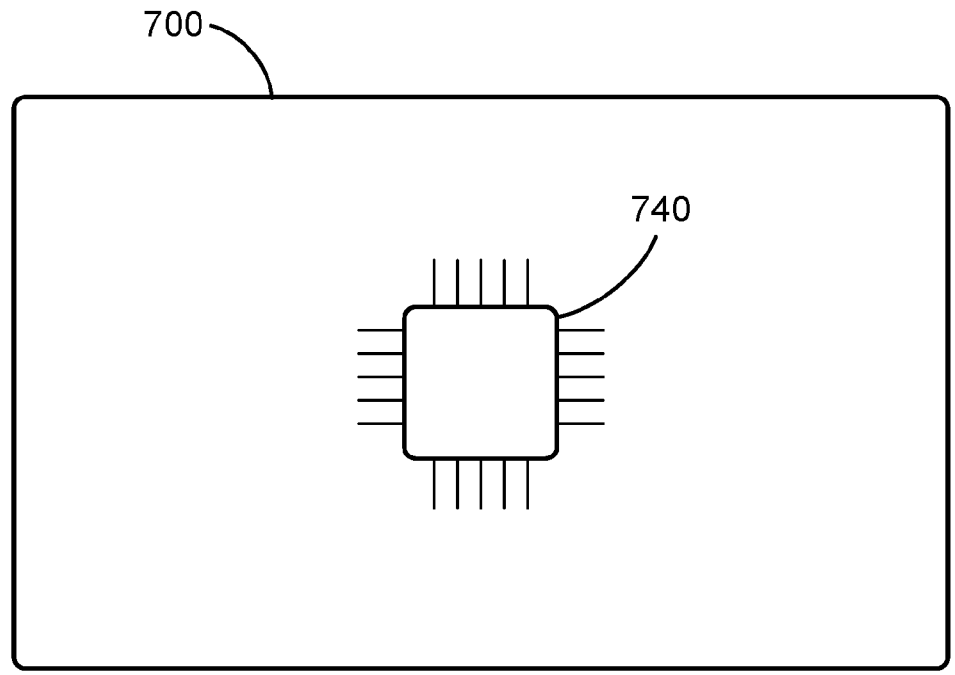
Figure 7

| 1002 Bus Timing | | | | | | |
|---|---|---|---|---|---|---|
| | | Request delay 1.8 ms | | Camera 3.5 ms | | |
| F/T ADC Reads 3.25 ms | I2C 200 us | F/T ADC Reads 3.25 ms | I2C 200 us | F/T ADC Reads 3.25 ms | I2C 200 us |
| Ecat frame 4 ms | | Ecat frame 4 ms | | Ecat frame 4 ms | |

Figure 10

SENSORIZED ROBOTIC GRIPPING DEVICE

CROSS-REFERENCE TO RELATED APPLICATIONS

The present application claims priority to U.S. patent application Ser. No. 17/857,443, filed Jul. 5, 2022, which is a continuation of U.S. patent application Ser. No. 16/867,720 (now U.S. Pat. No. 11,407,125), filed on May 6, 2020, entitled "Sensorized Robotic Gripping Device" which is a continuation of U.S. patent application Ser. No. 15/839,045 (now U.S. Pat. No. 10,682,774) filed on Dec. 12, 2017 and entitled "Sensorized Robotic Gripping Device" which are herein incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

The present application discloses implementations that relate to sensorizing a robotic gripping device with one or more non-contact sensors. Some example embodiments include a gripper with a plurality of digits attached to a palm that includes a time-of-flight sensor and an infrared camera. Additional example embodiments involve using sensor data from one or more non-contact sensors to evaluate grasp success. More specifically, an object-in-hand classifier may be used that takes as input sensor data of multiple different sensing modalities in order to determine a result of an attempt to grasp an object with a robotic gripper.

In one example, a robotic gripping device is disclosed that includes a palm and a plurality of digits coupled to the palm. The robotic gripping device further includes a time-of-flight sensor arranged on the palm such that the time-of-flight sensor is configured to generate time-of-flight distance data in a direction between the plurality of digits. The robotic gripping device additionally includes an infrared camera, comprising an infrared illumination source, where the infrared camera is arranged on the palm such that the infrared camera is configured to generate grayscale image data in the direction between the plurality of digits.

In a further example, a robot is disclosed that includes a robotic gripping device. The robotic gripping device includes a palm and a plurality of digits coupled to the palm. The robotic gripping device further includes a time-of-flight sensor arranged on the palm such that the time-of-flight sensor is configured to generate time-of-flight distance data in a direction between the plurality of digits. The robotic gripping device additionally includes an infrared camera, comprising an infrared illumination source, wherein the infrared camera is arranged on the palm such that the infrared camera is configured to generate grayscale image data in the direction between the plurality of digits.

In an additional example, a method is disclosed that includes receiving time-of-flight distance data in a direction between a plurality of digits of a robotic gripper from a time-of-flight sensor arranged on a palm of the robotic gripper, where the plurality of digits of the robotic gripper are coupled to the palm of the robotic gripper. The method further includes receiving grayscale image data in the direction between the plurality of digits of the robotic gripper from an infrared camera arranged on the palm of the robotic gripper. The method additionally includes controlling the robotic gripper based on the time-of-flight distance data and the grayscale image data.

In another example, a system is disclosed that includes means for receiving time-of-flight distance data in a direction between a plurality of digits of a robotic gripper from a time-of-flight sensor arranged on a palm of the robotic gripper, where the plurality of digits of the robotic gripper are coupled to the palm of the robotic gripper. The system further includes means for receiving grayscale image data in the direction between the plurality of digits of the robotic gripper from an infrared camera arranged on the palm of the robotic gripper. The system additionally includes means for controlling the robotic gripper based on the time-of-flight distance data and the grayscale image data.

In a further example, a method is disclosed that include controlling a robotic gripping device to cause a plurality of digits of the robotic gripping device to move towards each other in an attempt to grasp an object. The method further includes receiving, from at least one non-contact sensor on the robotic gripping device, first sensor data indicative of a region between the plurality of digits of the robotic gripping device. The method additionally includes receiving, from the at least one non-contact sensor on the robotic gripping device, second sensor data indicative of the region between the plurality of digits of the robotic gripping device, where the second sensor data is based on a different sensing modality than the first sensor data. The method also includes determining, using an object-in-hand classifier that takes as input the first sensor data and the second sensor data, a result of the attempt to grasp the object.

In an additional example, a robot is disclosed that includes a robotic gripping device and a control system. The robotic gripping device includes a plurality of digits and at least one non-contact sensor. The control system is configured to control the robotic gripping device to cause the plurality of digits of the robotic gripping device to move towards each other in an attempt to grasp an object. The control system is further configured to receive, from the at least one non-contact sensor of the robotic gripping device, first sensor data indicative of a region between the plurality of digits of the robotic gripping device. The control system is additionally configured to receive, from the at least one non-contact sensor on the robotic gripping device, second sensor data indicative of the region between the plurality of digits of the robotic gripping device, where the second sensor data is based on a different sensing modality than the first sensor data. The control system is further configured to determine, using an object-in-hand classifier that takes as input the first sensor data and the second sensor data, a result of the attempt to grasp the object.

In a further example, a non-transitory computer readable medium is disclosed having stored therein instructions executable by one or more processors to cause the one or more processors to perform functions. The functions include controlling a robotic gripping device to cause a plurality of digits of the robotic gripping device to move towards each other in an attempt to grasp an object. The functions further include receiving, from at least one non-contact sensor on the robotic gripping device, first sensor data indicative of a region between the plurality of digits of the robotic gripping device. The functions additionally include receiving, from the at least one non-contact sensor on the robotic gripping device, second sensor data indicative of the region between the plurality of digits of the robotic gripping device, where the second sensor data is based on a different sensing modality than the first sensor data. The functions also include
determining, using an object-in-hand classifier that takes as input the first sensor data and the second sensor data, a result of the attempt to grasp the object.

In another example, a system is disclosed that includes means for controlling a robotic gripping device to cause a plurality of digits of the robotic gripping device to move towards each other in an attempt to grasp an object. The system further includes means for receiving, from at least one non-contact sensor on the robotic gripping device, first sensor data indicative of a region between the plurality of digits of the robotic gripping device. The system additionally includes means for receiving, from the at least one non-contact sensor on the robotic gripping device, second sensor data indicative of the region between the plurality of digits of the robotic gripping device, where the second sensor data is based on a different sensing modality than the first sensor data. The system also includes means for determining, using an object-in-hand classifier that takes as input the first sensor data and the second sensor data, a result of the attempt to grasp the object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 6 is a table that includes types of gripper sensors for different manipulation classes, in accordance with example embodiments.

FIG. 7 illustrates a sensing device for a robotic gripper, in accordance with example embodiments.

FIG. 10 illustrates bus timing for a sensing device, in accordance with example embodiments.

DETAILED DESCRIPTION

Figure 1:
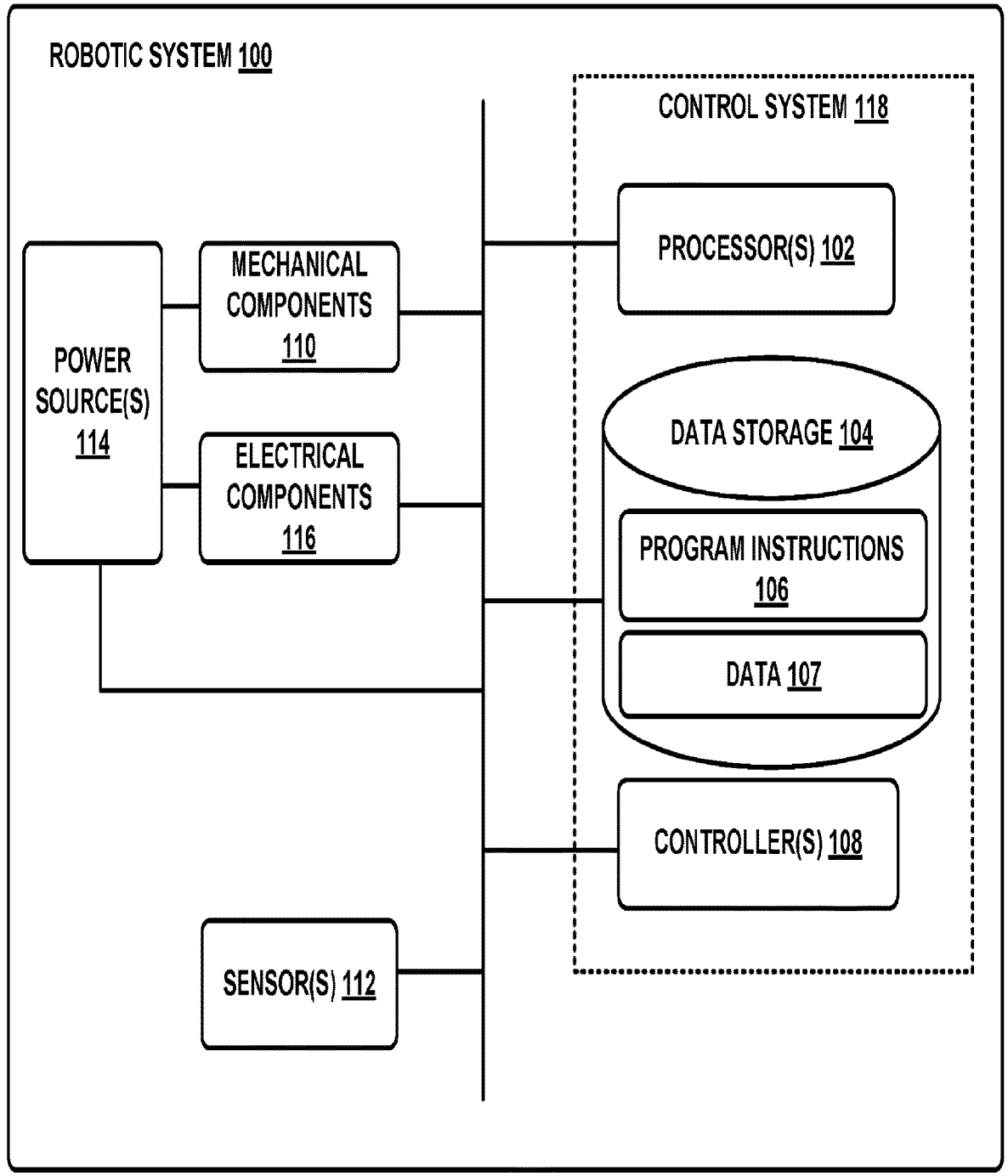
FIG. 1 illustrates a configuration of a robotic system, in accordance with example embodiments.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

Robotic end effectors may be used in many situations to allow a robotic device to interact with an environment by pushing, pulling, grasping, holding, or otherwise interacting with one or more objects in the environment. For instance, a robotic device may include a robotic gripper having one or more digits that can be actuated to change their shape, thereby allowing the robotic gripper to interact with the environment.

In the field of robotics, and robotic grippers in particular, the control system of a robotic device may operate more effectively when provided with information regarding the environment in the area surrounding each component of the robotic device. To provide this information, different types of sensors may be placed on or included in one or more components. However, increasing the number of sensors also means increasing the complexity of the system, as well as increasing the number of possible points of failure.

Some robots may include one or more sensors remote from a gripper that may be used by a control system to help control the gripper. For example, a head-mounted camera may provide data about a gripper located at the end of a robotic arm. However, certain tasks may be difficult to perform with only data from a remote sensor. Such tasks may include controlling the approach path of a gripper towards an object, verifying that an object has been successfully grasped, and detecting when the object slips within the gripper after the object has been grasped. Accordingly, it may be advantageous to position one or more sensors on or proximate to a robotic gripper or other end effector of a robot.

In some examples, one or more force-based or tactile contact sensors may be placed in a robotic gripper. More specifically, such sensors may be placed within the digits to detect when an object has been grasped and possibly to evaluate the quality of such a grasp. However, force-based solutions may not be reliable, especially when the gripper includes underactuated digits. An underactuated digit has less control inputs than degrees of freedom. For instance, an underactuated digit may include one or more unactuated joints that are not separately actuatable by a control system. One benefit of underactuated digits is that they may require less complex control systems and may be simpler to manufacture than fully actuated digits. However, it may be difficult for a control system to evaluate grasp success or grasp quality for a gripper with underactuated digits. As an example, it may be difficult to determine whether two underactuated robot digits have successfully grasped a piece of paper or a plastic cup. In such cases, the digits may be positioned close together and applying the same amount of force whether or not a grasp is successful.

Additionally, in some examples, it may be desirable to have robot digits that are easily replaceable or even interchangeable. In such systems, including sensors or other electronics within the digits may be disadvantageous.

In some examples, one or more non-contact sensors may be placed within the palm of a robotic gripping device, such as an underactuated gripper with two opposable digits. By placing such sensors on the palm and directing them toward an area between the digits, more accurate sensor data of the area between the digits may be obtained than by using remote sensors. Additionally, by using non-contact sensors on the palm, disadvantages associated with using contact sensors in the digits may be avoided.

In some examples, a non-contact sensor or combination of non-contact sensors on the palm may be used to produce sensor data with multiple different sensing modalities. A sensing modality refers to a form of sensory perception that produces a particular form of sensor data. In some examples, a single sensor may be capable of generating sensor data of multiple different modalities. In further examples, multiple sensors may be positioned on the palm of a gripper, with each sensor capable of generating sensor data of one or more distinct modalities.

When considering the placement of one or more non-contact sensors on the palm of a gripper, care must be taken to maximize the benefit of the sensors across a range of applications while minimizing the costs associated with sensorizing the gripper. In some examples, such sensors may be evaluated for their ability to assist a control system in controlling a gripper through several distinct gripping phases, including object approach, verifying grasp success, and slip failure detection.

In some examples, the palm of a gripper may be provided with a time-of-flight sensor and an infrared camera. Such a combination may provide good fidelity across a range of gripping applications while also providing sufficient compactness to fit within the palm. Additionally, the combination may also provide low compute requirements with minimal required post-processing of sensor data. More specifically, the low cost, small size, low power draw, and relatively low data rate requirements of a time-of-flight sensor and an infrared camera together are advantages over other sensing modalities such as three-dimensional time-of-flight cameras, light detection and ranging (LIDAR) sensors, or structured light sensors.

The time-of-flight sensor may be configured to measure distance of an object from the palm of the gripper independent of the object's reflectance. In particular, rather than measuring an amount of light reflected back from the object (which depends on the object's color and surface type), time-of-flight distance data can instead be obtained by measuring the time it takes light to travel to the nearest object and reflect back to the sensor. The time-of-flight sensor may include a separate light emitter and detector in order to measure distance to an object. As an example, the time-of-flight sensor may have a roughly 35 degree field of view extending out from the palm of the gripper up to a range of about half a meter.

In further examples, the time-of-flight sensor may also be used to generate a separate reflectance measurement indicative of the reflectance of a detected object. The reflectance may be measured as a return signal rate detected during the range measurement. The reflectance measurement generated by a time-of-flight sensor may be considered a separate modality from the time-of-flight distance data. When a gripper is holding an object, the object may yield a significantly different reflectance value than when the gripper is not holding an object.

As noted, the palm of a gripper may include the combination of both a time-of-flight sensor and an infrared camera. The infrared camera may be configured to provide relatively high-rate, low-resolution grayscale imagery. The camera may also have built-in illumination with an infrared illumination source. External illumination allows for acquisition of reliable image data in dark environments so that the robot gripper can sense dark corners, backs of shelves, etc. By using infrared lighting, the camera may allow for unobtrusive "flash-lighting," where the light is not human perceivable, but the light is perceived by the infrared camera in the robot gripper. In some examples, the camera may be a micro infrared camera of a type typically used for gaze tracking in cell phones. As a specific example, the microcamera may be configured to generate 60×60 grayscale images. Additionally, the infrared microcamera and a time-of-flight sensor may be small enough to both fit on the palm of a robot gripper.

In further examples, the palm of a gripper may be equipped with multiple time-of-flight sensors, with or without an infrared camera. For instance, first and second time-of-flight sensors may be placed on either side of an infrared camera on the palm of the gripper. Each time-of-flight sensor may have a different sensing range. For instance, a first short-range time-of-flight sensor may be used to detect objects in a range of 0-10 centimeters, and a second long-range time-of-flight sensor may be used to detect objects in a range of 10-200 centimeters. The short-range time-of-flight sensor may be more effective when the gripper is closed, while the long-range time-of-flight sensor may be more effective during approach when the gripper is open. In some examples, a control system may explicitly switch between using data from the short-range time-of-flight sensor or the long-range time-of-flight sensor depending on the gripper state. The combination of a short-range time-of-flight sensor and a long-range time-of-flight sensor may be used to provide a maximal amount of information increase while minimizing hardware and/or software overhead. In further examples, angular information may also be obtained based on the placement of the time-of-flight sensors on the palm.

In additional examples, an infrared camera may have a sensing range which extends past the range of the short-range time-of-flight sensor, but not as far as the long-range time-of-flight sensor. For instance, the camera may have a range of approximately 60 centimeters. The camera may therefore be most effective for detecting objects near the tips of the digits.

One or more non-contact sensors may be included on a printed circuit board (PCB), which is attached to the palm of the gripper. For instance, in one example, each of a micro infrared camera, a short-range time-of-flight sensor, and a long-range time-of-flight sensor may be attached to the PCB. In some examples, the PCB may interface with a separate sensor board that services a force/torque cell for a robotic wrist that is coupled to the palm of the gripper. In further examples, the PCB may additionally include an inertial measurement unit (IMU), which may be placed on the back of the PCB. The IMU may be a low-cost component that is easy to integrate into the hardware and nearly free in terms of offering additional information about the gripper.

Within examples, sensor data of multiple different modalities may be used as inputs to an object-in-hand classifier that outputs whether or not a robot gripper is holding an object. An object-in-hand classifier is an algorithm or function that maps inputted sensor data to categories corresponding to different grasp states. The classifier may be used to determine if the gripper was successful in grasping an object. By using multiple modalities of sensor data, the classifier may achieve a higher accuracy rate than by using a single modality. For instance, certain cases may be likely to trick one sensor type or another (e.g., it may be difficult for a camera to differentiate between closed digits versus an object held by the digits). Using multiple modalities may help the object-in-hand classifier resolve such cases. Multimodal sensor data may be obtained from at least one non-contact sensor on the palm of the gripper. Example modalities that may be used as inputs to an object-in-hand classifier include infrared image data, time-of-flight distance data, and time-of-flight reflectance data. An object-in-hand classifier may be particularly beneficial when using under-actuated grippers where complete information about digit position is not readily available.

In further examples, the object-in-hand classifier may be a machine learning model trained based on results from the robotic gripping device used by the robot and/or similar robotic gripping devices used by the robot or different robots. The machine learning model may also be trained by simulated grasping events using a digital representation of the gripper in software. In some examples, the machine learning model may be a support vector machine (SVM). For instance, the SVM may take as input a grayscale image from an infrared camera, a time-of-flight distance measurement, and a time-of-flight reflectance measurement. The SVM may then output whether or not an attempted grasp of an object was successful. As another example, the SVM may take as input only distance and reflectance measurements from a single short-range time-of-flight sensor on the palm.

In further examples, additional and/or other types of data, including non-contact-based and/or contact-based modalities may be used as input. Other types of machine learning models may be used instead of an SVM as well, such as a neural network. In further examples, a heuristics-based object-in-hand classifier may be used instead of a machine learning model.

Sensor data from one or more non-contact sensors on the palm of a robot gripper may also be used for other applications besides grasp failure detection. Such applications may involve heuristics-based approaches and/or machine learning models. In some examples, multimodal sensor data may be used in order to control the approach of a gripper towards an object to be grasped. In particular, the sensor data may be used to center the gripper on an object to grasp during a visual servoing process. The sensor data may also be used to determine an appropriate stopping distance to avoid knocking over an object. In further examples, the sensor data may also be used after a successful grasp for slip detection. Other applications of multimodal non-contact sensor data from a sensorized gripper are also contemplated.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), digit(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable digits, arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or digit to measure the load on the actuators that move one or more members of the arm, leg, hand, foot, or digit. As another example, the robotic system 100 may use one or more position sensors to sense the position of the actuators of the robotic system. For instance, such position sensors may sense states of extension, retraction, positioning, or rotation of the actuators on arms, legs, hands, feet, digits, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
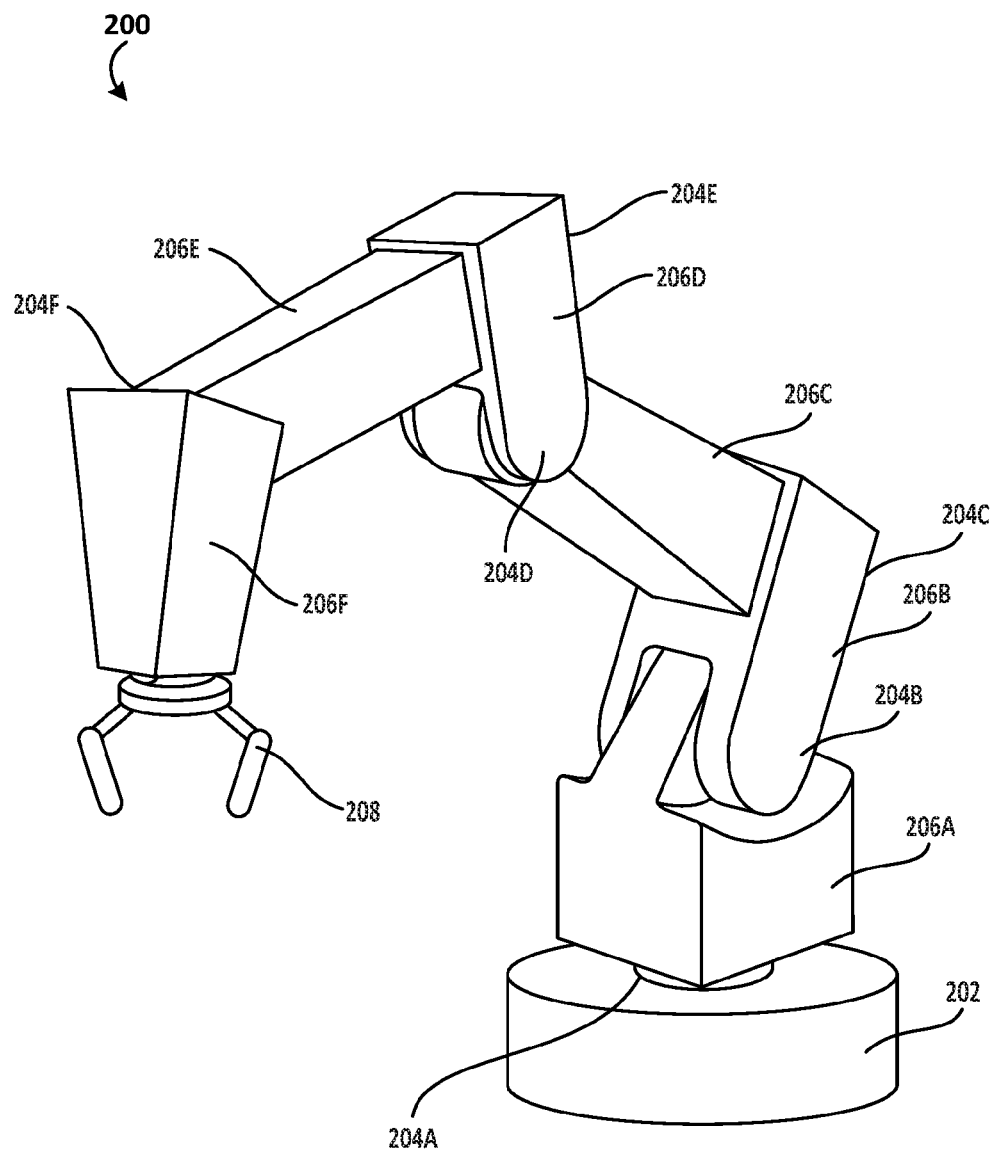
FIG. 2 illustrates a robotic arm, in accordance with example embodiments.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a digit gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
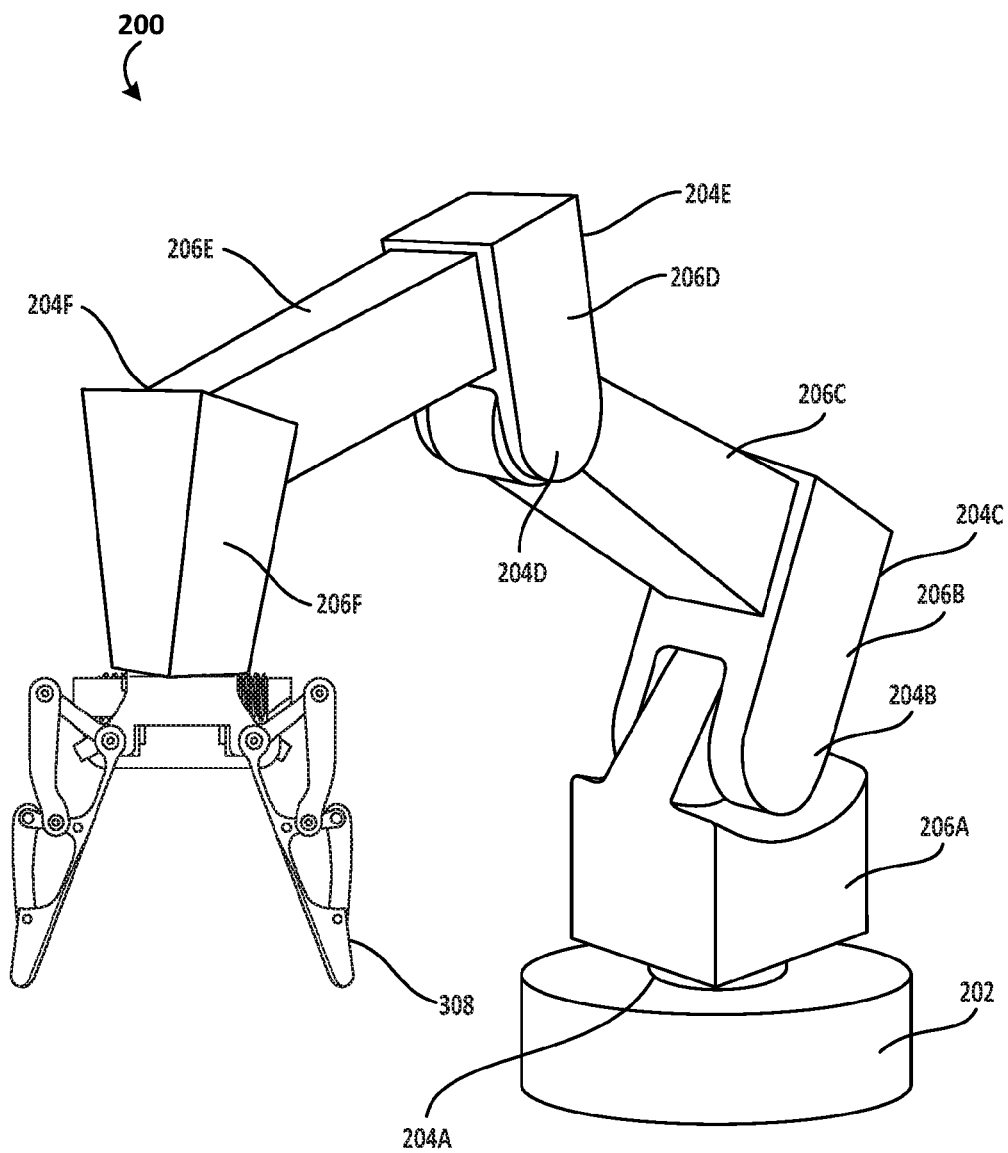
FIG. 3 illustrates a robotic arm having an underactuated robotic gripper, in accordance with example embodiments.

FIG. 3 shows the example robotic arm 200 with an underactuated robotic gripping device 308. Robotic gripping device 308 may be similar or identical to any of the underactuated robotic gripping devices described in more detail below.

III. Example Underactuated Robotic Gripping Device

Figure 4:
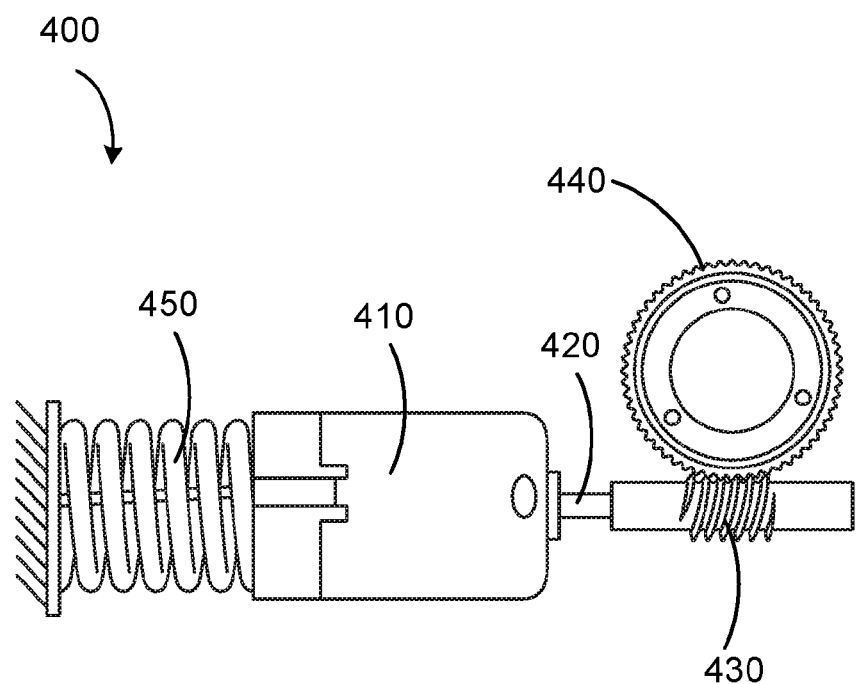
FIG. 4 illustrates a mechanism for an underactuated robotic gripper, in accordance with example embodiments.

As noted above, the present disclosure includes implementations that relate to robotic gripping devices and/or end effectors. FIG. 4 illustrates a mechanism for an underactuated robotic gripper that may be used in accordance with example embodiments described herein. In FIG. 4, assembly 400 may include an actuator having a motor 410 and a shaft 420. Shaft 420 may be coupled to a worm 430. Worm 430 may be coupled to worm gear 440. And in turn, worm gear 440 may be coupled to a robotic digit (not shown) such that rotation of the worm gear 440 moves the robotic digit. In addition, assembly 400 may include a spring 450 that is coupled to motor 410 on a first end, and is fixed on a second end.

In one example, motor 410 may be actuated, and may cause shaft 420 to rotate in a clockwise direction. Shaft 420 may in turn cause worm 430 to rotate in a clockwise direction as well. And further, worm 430 may cause worm gear 440 to rotate, causing a robotic digit to move. Worm 430 may be able to drive worm gear 440 in either direction. However worm gear 440 may not be able to drive worm 430. As such, this orientation may not be back-drivable, and in the case where the motor is turned off or disengaged, shaft 420, worm 430 and worm gear 440 may remain stationary or relatively stationary. In this state, a torque may act upon worm gear 440 (i.e., a force acting upon a digit coupled to worm gear 440). That force may attempt to rotate the worm gear to back-drive the worm, however because the worm is not back-drivable, the entire subassembly will slide, compressing the spring. In this manner, forces or torques acting upon the digit coupled to the worm gear may pass through the assembly and cause the spring to compress or expand.

Figure 5:
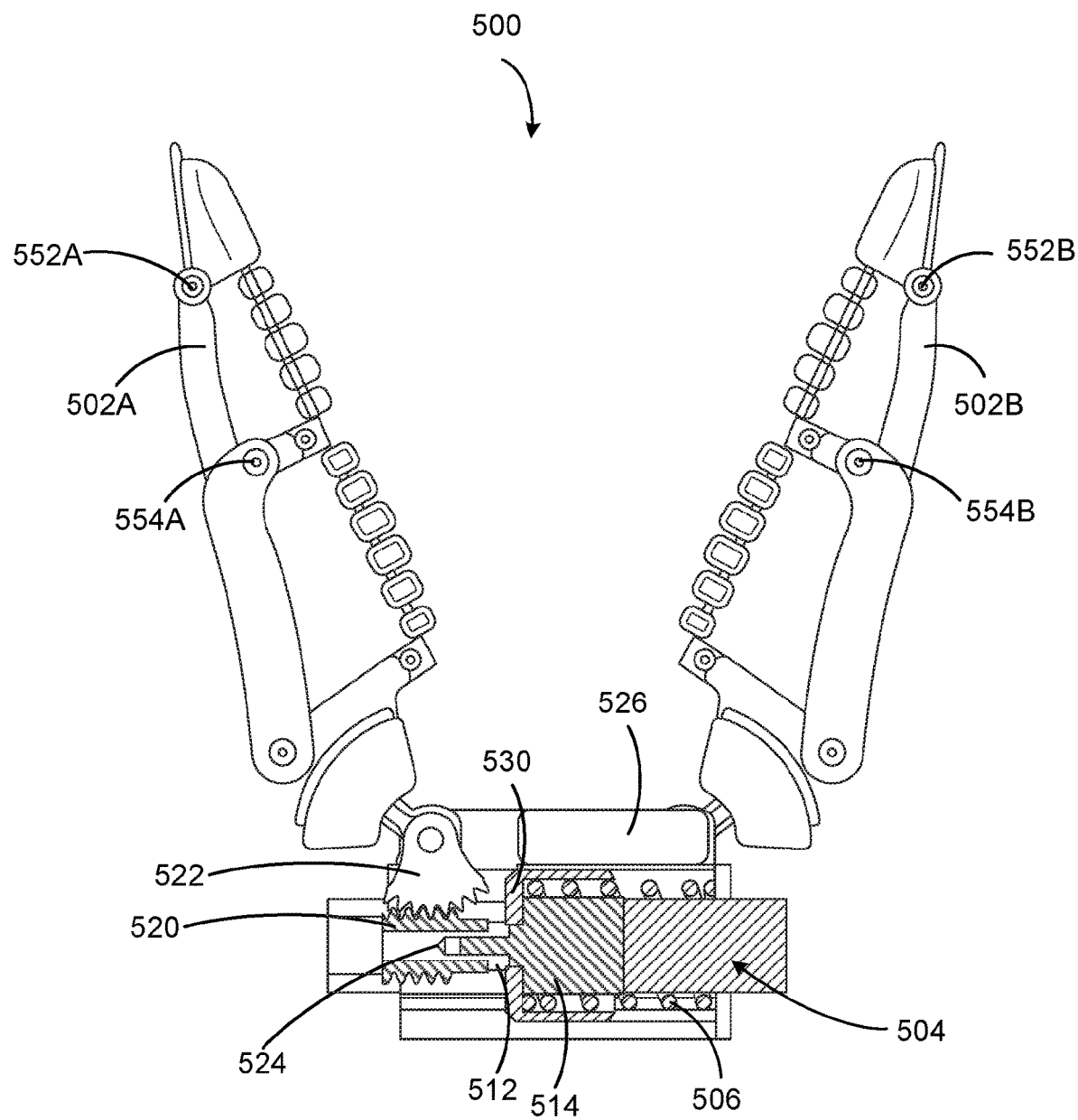
FIG. 5 illustrates an underactuated robotic gripper, in accordance with example embodiments.

FIG. 5 illustrates an example underactuated robotic gripping device, including components arranged to carry out the operation of the mechanism discussed with reference to FIG. 4. Robotic gripping device 500 may be implemented as a mechanical component of system 100 and/or robotic arm 200. Although the components illustrated in FIG. 5 are shown with a certain orientation and/or design, it should be understood that one or more components of robotic gripping device 500 may be removed, added, and/or modified while remaining within the scope of this disclosure. Also, the orientation and combination of components may be changed based on the desired implementation.

Robotic gripping device 500 may include one or more physical components, including one or more digits 502A-B, actuators 504, and/or springs 506. In some examples, robotic gripping device 500 may include two opposable digits, as shown in FIG. 5. In other examples, more or fewer digits may be included. Where three or more digits are included, the digits may be arranged in two groups opposing each other, such that when they are actuated they close toward each other. Two digits may be positioned opposite the third, such that when the digits close they interlock. In other examples, the digits may be positioned or spaced evenly around a palm or base section. Other arrangements are possible as well.

Each digit 502A-B may be configured to move in a gripping direction, to contact, grasp, hold, grip, or otherwise interact with an object. In this disclosure, movement of the digit(s) may refer to rotation about one or more axes. For example, the base of each digit may be rotatably coupled along a respective axis to one or more other components of the robotic gripping device, and movement of each digit may include rotation of the digits about the respective axes. In some example the axis of rotation of a digit may be the axis about which a worm gear coupled to the digit rotates.

In other examples, movement of the digits may include translational movement along an axis, such as movement in a clamping or sliding manner. The digits may be coupled to one or more components of the robotic gripping device in a manner that allows them to maintain their orientation with respect to the gripping device (i.e., without rotating). For instance, a digit may move in a manner similar to how the components of a vice move, such that the plane created by the gripping surface of a digit remains fixed relative to the gripping device while movement of the digits occurs. Or, the movement may be a combination of rotation and translation. Other types of movement are contemplated, with the above examples being included for description and to aid in understanding of the concepts involved herein.

The gripping surface of the digits may be flexible and/or deformable, and may be a flexible plastic, rubber, or other material suitable for gripping an object. As a result, movement of a digit may include deformation of the gripping surface and/or structure of the digit. For example, the digit may deform, bend, curve, distort, warp, stretch, or otherwise alter its shape based on one or more factors, such as an impacting force or pressure. In an example embodiment, a two digit robotic gripping device such as the one shown in FIG. 5 may include an object placed at the midpoint of the digits. When the digits close on the object, the object may cause the tips of the digits to bend or curl around the object. As described herein, movement of the digits may include this deformation of the digits.

In some examples, the digits may be underactuated. Underactuated digits do not include an actuator for each joint of the digit, but instead have fewer actuators and cannot control each joint independently. One benefit of underactuated digits is that they can require less complex control systems and can be simpler to manufacture than fully actuated digits. In reference to FIG. 5, joints 552A-B and 554A-B may be underactuated joints that may not be independently actuated by separate actuators.

In some examples, a deformable gripping surface of an underactuated digit may be a single or unitary component. In other examples, a deformable gripping surface may include a plurality of members coupled together end-to-end to create an elongated gripping surface. The plurality of members may be rotatably coupled together by unactuated joints, such as pin joints, rolling joints, or circular joints, for example. Further, a deformable gripping surface may be configured to be generally straight under normal circumstances, such as when no pressure or force is applied to the surface and the digit is in a normal operating state. In other examples, a deformable gripping surface may be configured to have a bend or curve under normal circumstances (i.e., a biased shape), such that when no pressure or force is applied to the gripping surface it is curved or bent nonetheless.

In some examples, a deformable gripping surface may run the entire length of the digit between the digittip and the base of the digit. In other examples, a deformable gripping surface may be included on only a portion of an inner surface of the digit, such that only a portion of the digit includes the deformable gripping surface.

For purposes of explanation, the components of FIG. 5 will be described with respect to a single digit. However, multiple digits, actuators, springs, and gears may be included in a robotic gripping device in accordance with examples described herein.

In FIG. 5, digit 502A may be coupled to a worm gear 522. In some examples, worm gear 522 may be connected directly to a bottom end of digit 502A. In other examples, worm gear 522 may be coupled to digit 502A through one or more other gears and/or components, and may be coupled to a section other the digit other than the bottom end. As used herein, a first component "coupled" to a second component means that the two components may be directly connected to each other, or may have one or more components, gears, shafts, or connecting elements placed between them. As shown in FIG. 5, worm gear 522 is directly connected to digit 502A.

Worm gear 522 may be a circular worm gear or worm wheel, having teeth facing outward surrounding an inner wheel. In some examples, the shape of worm gear 522 may be a partial circle, such as the worm gear shown in FIG. 5. Further, the shape of worm gear 522 may be either symmetric or asymmetric, full or partial, and may be a circle or any other shape. Worm gear 522 may be coupled to digit 502A such that rotation of worm gear 522 causes digit 502A to move and/or rotate. And further, worm gear 522 may be coupled such that rotation and/or movement of digit 502A causes the worm gear to rotate (i.e., worm gear 522 and digit 502A can drive each other). In some examples, the teeth of worm gear 522 may be curved and/or angled to provide a smoother coupling to worm 520. This may result in smoother operation of the robotic gripping device.

Robotic gripping device 500 may also include an actuator 504. Actuator 504 may include a motor 514 and a shaft 512. When the actuator is turned on, engaged, or otherwise activated, motor 514 may rotate shaft 512 in a clockwise or counterclockwise direction. Shaft 512 may be coupled to worm 520, and may be configured to cause worm 520 to rotate. Worm 520 may be a cylindrical gear, with teeth similar to the threads on a screw or bolt. Worm 520 may also be called a 'worm screw.' Worm 520 may be coupled to worm gear 522 such that the axis of rotation of worm 520 is perpendicular to the axis of rotation of worm gear 522.

Worm 520 and worm gear 522 may have a high reduction ratio. Where there is a high reduction ratio, one full rotation of worm 520 may correspond to $\frac{1}{32}$ of a full rotation (or some other small amount) of worm gear 522. The reduction ratio may depend on the number and spacing of the teeth of worm gear 522 and worm 520. A characteristic of the high reduction ratio is that the worm is not back-drivable. As such, a force rotating worm 520 may cause worm gear 522 to responsively rotate, but a force rotating the worm gear 522 may not cause the worm 520 to responsively rotate.

In some examples, actuator 504 may be mounted on a carriage 530 such that the actuator 504 and carriage 530 are configured to slide together along an axis. One or more components of actuator 504 may be glued, screwed, or otherwise affixed to carriage 530. Carriage 530 in turn may be coupled to a base section via a sliding coupling or other low friction coupling. As such, carriage 530 may be free to slide along one axis. Carriage 530 may be any component that allows actuator 504 to slide along the axis. As such, carriage 530 may be any shape or dimension that couples to actuator 504 to allow the actuator to slide along the axis, and may be a plastic, metal, composite, or other material.

Robotic gripping device 500 may also include a spring 506. Spring 506 may have two ends, with a first end coupled to actuator 504 and a second end fixed. In FIG. 5, the second end of spring 506 is fixed to the base of robotic gripping device 500. Spring 506 may be fixed to another component of robotic gripping device 500 as well. In some example, spring 506 may be configured such that the first end moves when carriage 530 and actuator 504 slide. When actuator 504 and carriage 530 are in a first position, spring 506 may be at equilibrium. Equilibrium means that the forces acting on the spring are balanced, such that an added force is required to compress or expand the spring. Then when actuator 504 slides to a second position (due to one or more forces or torques acting on the robotic gripping device), spring 506 may be compressed or expanded such that spring 506 is no longer at equilibrium. In this state, spring 506 may impart a responsive force on actuator 504 in an attempt to return to the first position at which the spring is at equilibrium.

In some examples, the spring may surround the actuator, such as spring 506 shown in FIG. 5. More or less of actuator 504 may be surrounded by spring 506 than shown in FIG. 5. Arranging spring 506 around actuator 504 results in a more compact design, allowing a robotic gripping device to be smaller and thus appropriate for more uses and applications. In other examples, two or more springs may be used, and the spring(s) may be positioned to the side or otherwise not surrounding the actuator.

Spring 506 may have one or more characteristics, such as size, firmness, spring constant, and/or material. Each of these characteristics may be altered based on the particular application of the robotic gripping device. For example, a spring with a higher spring constant may require more force to compress or expand, which may be used to determine the appropriate spring to use for a particular application.

In some examples, the robotic gripping device may also include one or more encoders, sensors, or detectors configured to detect the rotation, position, movement, and/or forces acting on one or more parts of the robotic gripping device. For example, robotic gripping device 500 may include actuator encoder 524, which may be positioned on or coupled to the base of robotic gripping device 500. Actuator encoder 524 may be configured to detect the rotation of shaft 512, and may provide information about the extent or amount of rotation to a control system. Actuator encoder 524 may also be positioned on the shaft 512, or may be positioned on one or more other components of robotic gripping device 500. In some examples, actuator encoder 524 may detect the rotation of the actuator with respect to motor 514, the base of the robotic gripping device, and/or one or more other components. As such, both relative and absolute amounts of rotation of shaft 512 may be detected. Further, robotic gripping device 500 may include one or more digit encoders configured to detect the rotation and/or movement of one or more digits.

Actuator encoder 524 and/or the one or more digit encoders may be rotary encoders. In some cases, the encoders may be mechanical, optical, magnetic, capacitive, or another type of encoder. In addition, the encoders may be absolute or may be incremental.

In some examples, robotic gripping device 500 may include one or more linear encoders or potentiometers 526. Potentiometer 526 may be configured to detect a position of carriage 530 relative to the base of the robotic gripping device, and provide an output that may be received by a control system. The potentiometer may also detect a relative movement of carriage 530. In some examples, potentiometer may detect the position of carriage 530 in a first position in which spring 506 is at equilibrium, and detect the position of carriage 530 when the spring is compressed or expanded. The potentiometer may determine the difference between the first and second position and provide this information to the control system. Various types of linear encoders may be used, such as optical, magnetic, capacitive, or inductive encoders.

Robotic gripping device 500 may also include a control system such as control system 118 in FIG. 1, which may control one or more aspects of robotic gripping device 500. The control system may include one or more processors, and may also include a non-transitory computer-readable memory, which may have stored thereon instructions executable by the one or more processors to carry out one or more actions described herein.

In some examples, the control system may determine an amount of torque acting on digit 502A by receiving information from potentiometer 526. The information provided by potentiometer 526 may include a distance the actuator has translated between a first position (equilibrium) and a second position (non-equilibrium). The control system may then determine the amount of torque based on the difference between the first and second positions and a characteristic of the spring, such as a spring constant. In some examples, the control system may also be configured to identify an object for the robotic gripping device to grasp, and activate one or more actuators to move one or more digits of the robotic gripping device in order to attempt to grasp the object.

IV. Example Sensorized Grippers

FIG. 6 is a table that includes types of gripper sensors for different manipulation classes, in accordance with example embodiments. More specifically, table 600 of FIG. 6 includes manipulation classes 602 with different levels of complexity, and sensors 604 corresponding to each of the manipulation classes 602. As design motivation for a sensorized gripper, a goal may be to enable data-rich information for accelerating performance in manipulation tasks. Within examples, the philosophy may be to rapidly grow the sensor modalities and coverage on a gripper by deploying hardware and software in stages. In particular, such a process may involve starting with the lowest complexity sensor suites and moving towards more technically challenging modalities. In addition the implementation may be done "transparently," to allow for complete fallback to existing hardware and software without disruption of the status quo.

It should be noted that complexity of implementation is not necessarily correlated to the capabilities unlocked by specific sensing modalities. Roughly, as shown in table 600 of FIG. 6, in order of complexity, sources of information for manipulation can be bucketed into object occupancy, grasp shape, force closure, and slip detection.

Object occupancy, or detecting if an object is actually present in the gripper, may be considered the lowest complexity manipulation class. However, this manipulation class may be of particular importance when working with under-actuated grippers. In some examples, sensors used to detect object occupancy may include one-dimensional (1D) time-of-flight (ToF) sensors, which may be capable of generating individual time-of-flight distance and/or reflectance measurements; red green blue (RGB) and/or infrared (IR) cameras; and microphones.

A somewhat more complex manipulation class may involve determining information about grasp shape, which may also be used to infer information about grasp force and grasp quality. In some examples, sensors used to detect grasp shape may include radar; commercial off-the-shelf (COTS) tactile digit pads; dynamic vision sensor (DVS) cameras; an inertial measurement unit (IMU) in each digit; and three-dimensional (3D) ToF cameras.

More challenging still (and arguably unnecessary for pick and place) are sensing modalities that give direct information about the contact forces during grasping, first at a gross scale (force closure) and then at a much finer scale (slip detection). In some examples, sensors used to detect force closure and/or slip detection may include custom tactile digit pads, force digitnails, knuckle three degree-of-freedom (3DoF) sensors, strain gauges, and imaging-based tactile sensors.

Within examples, an existing underactuated gripper, such as described herein with respect to FIGS. 4 and 5, may be augmented with selected sensors from Table 6 to allow for immediate improvement on the detection of grasp success and later benefits of rich sensor data for machine learning algorithms.

FIG. 7 illustrates a sensing device for a robotic gripper, in accordance with example embodiments. More specifically, printed circuit board (PCB) 700 may be configured to fit into the palm of a robotic gripper, such as an underactuated gripper described in reference to FIGS. 4 and 5. The PCB 700 may include sensors including a short-range time-of-flight sensor 710, a long-range time-of-flight sensor 720, and an infrared microcamera 730 arranged on a front side of PCB 700. The PCB 700 may additionally include an IMU 740 arranged on a rear side of PCB 700.

The short-range time-of-flight sensor 710 may include a narrow light source 712 and a light detector 714 to measure how long it takes laser light projected by the light source 712 to bounce back after hitting an object. This time may be used to accurately determine a range or distance to a nearest object from the short-range time-of-flight sensor 710 based on the known speed of light. As an example, the short-range time-of-flight sensor 710 may have a range of about 1 centimeter up to 20 centimeters from the palm of the gripper. Additionally, the short-range time-of-flight sensor 710 may have a relatively narrow field of view (e.g., 40 degrees) in order to detect objects within a cone of sensing range extending out from the light detector 714. Based on its range, the short-range time-of-flight sensor 710 may be most effective for determining information about grasped objects.

In addition to a time-of-flight distance measurement, the short-range time-of-flight sensor 710 may additionally be configured to produce a reflectance measurement indicative of total activity returned to the light detector 714. More specifically, a return signal rate may be generated based on the return signal count during the convergence time for the range measurement. This reflectance value or intensity value may be measured in a unit of mega-counts per second (mcps).

The long-range time-of-flight sensor 720 may also include a light source 722 and a light detector 724. However, the long-range time-of-flight sensor 720 may be configured to detect objects further away from the palm of the gripper than the short-range time-of-flight sensor 710. For instance, the long-range time-of-flight sensor 720 may be configured to detect objects within a range of 3 centimeters up to 200 centimeters from the palm of the gripper. The long-range time-of-flight sensor 720 may also have a narrower field of view than the short-range time-of-flight sensor 710. For instance, the long-range time-of-flight sensor 720 may have a field of view of 25 degrees. The long-range time-of-flight sensor 720 may therefore detect a narrower cone of space in the area between gripper digits than the short-range time-of-flight sensor 710. Like the short-range time-of-flight sensor 710, the long-range time-of-flight sensor 720 may also be configured to generate a reflectance measurement in addition to a distance measurement. Based on its range, the long-range time-of-flight sensor 720 may be most effective for detecting objects to approach with the gripper.

The infrared microcamera 730 may include an infrared illumination source 732 configured to illuminate an area in front of the palm of the gripper with infrared radiation. The infrared microcamera 730 may additionally include an infrared sensitive receiver 734 for detecting at least a portion of the illuminated area. External illumination improves the performance of infrared camera 730. And by relying on external illumination, the camera 730 can detect objects in low-light areas or even in total darkness. The camera 730 may provide relatively high-rate, low-resolution grayscale images. A grayscale image is one in which each pixel represents only an amount or intensity of light (in this case, infrared light, or a combination of visible light and infrared light). As a specific example, the camera 730 may generate 60×60 grayscale images with a range of about 60 centimeters from the palm of the gripper. In some examples, the camera 730 may be configured to detect objects within a range that extends past the range of the short-range time-of-flight sensor, but does not extend as far as the range of the long-range time-of-flight sensor. Accordingly, the camera 730 may be most effective for detecting objects near the tips of the digits of the gripper.

In some examples, a sensing device may additionally include an external infrared diffuser 736 to improve the performance of the infrared camera 730. Infrared cameras are generally susceptible to "hot spots," overexposed sections of the image corresponding to regions where intensity from artificial infrared illuminators is greatest. More specifically, the infrared camera 730 may include an integrated illuminator 732 with a narrow beam which saturates central features that reflect infrared light back into the camera 730. If the infrared camera is of a type designed for gesture recognition, the camera may be configured to underexpose regions that are not overexposed, which could exacerbate the problem. Although the imager's intrinsic dynamic range may cover, e.g., a 9-bit measurement span for intensity, the returned product may be significantly degraded as content is pushed to extrema pixel value. This effect may reduce extractable information and prevent robust feature identification.

Hot spot artifacts created by irregular reflections may cause a "headlight in fog" condition where illumination only works to blind the imager's ability to capture the scene. Irregular reflections may be produced by even regular objects when not aligned. This may undermine robot control functionality that depends on the image data, such as the ability to detect objects in hand or to visually servo based on detected edges.

To address this potential problem, an infrared diffuser 736 may be placed over the illumination source 732 or the entire infrared camera 734. The diffuser 736 may be configured to diffuse (e.g., soften or spread out) concentrated infrared light from the infrared illumination source 732. The diffuser 736 may have various shapes and sizes, and may be made of various materials. In some examples, the diffuser 736 may be a rectangular semi-transparent plastic component external to the infrared camera 734. In other examples, the diffuser 736 may be integrated inside the infrared camera 734 instead. In further examples, the diffuser 736 may include multiple layers, possibly with each layer being made of a different material. The infrared diffuser 736 may significantly improve performance of the infrared camera 734 in detecting edges and resolving other features in an area extending out from the palm of a robot gripper.

As shown in FIG. 7, the infrared camera 730 may be arranged between the short-range time-of-flight sensor 710 and the long-range time-of-flight sensor 720 on PCB 700. By spacing out the time-of-flight sensors in this manner, additional angular information may be obtained about the region between the digits of the gripper. In further examples, the time-of-flight sensors 710, 720 and the infrared camera 730 may be positioned in different arrangements on PCB 700.

In other examples, different numbers and/or types of non-contact sensors may be used instead of those illustrated in FIG. 700. In particular, only a single time-of-flight sensor capable of generating both accurate short-range and long-range distance data may be used instead of multiple time-of-flight sensors. Additionally, a different type of microcamera such as an RGB camera or an ultraviolet camera may be used instead of or in addition to an infrared camera in some embodiments. Other sensors could also be integrated into the system, including for example an RGB color sensor.

The IMU 740 positioned on the back of the PCB 700 may be relatively easy to integrate into the hardware and therefore may be nearly free in terms of offering additional information about the gripper. In particular, the IMU 740 may be configured to detect vibration on contact, particularly to confirm that an object is being touched by the gripper or for slip detection. In other examples, IMU 740 may not be included on PCB 700.

In terms of power budget, in an example implementation, the average combined power draw of the short-range time-of-flight sensor 710, the long-range time-of-flight sensor 720, the infrared camera 730 and the IMU 740 is less than 300 milliamps (mA). The peak combined power draw is approximately one amp. More specifically, the short-range time-of-flight sensor may have a 25 mA peak (2 mA average), the long-range time-of-flight sensor may have a 19 mA average, the infrared camera may have a 860 mA peak, and the IMU may have a 4 mA average.

Figure 8:
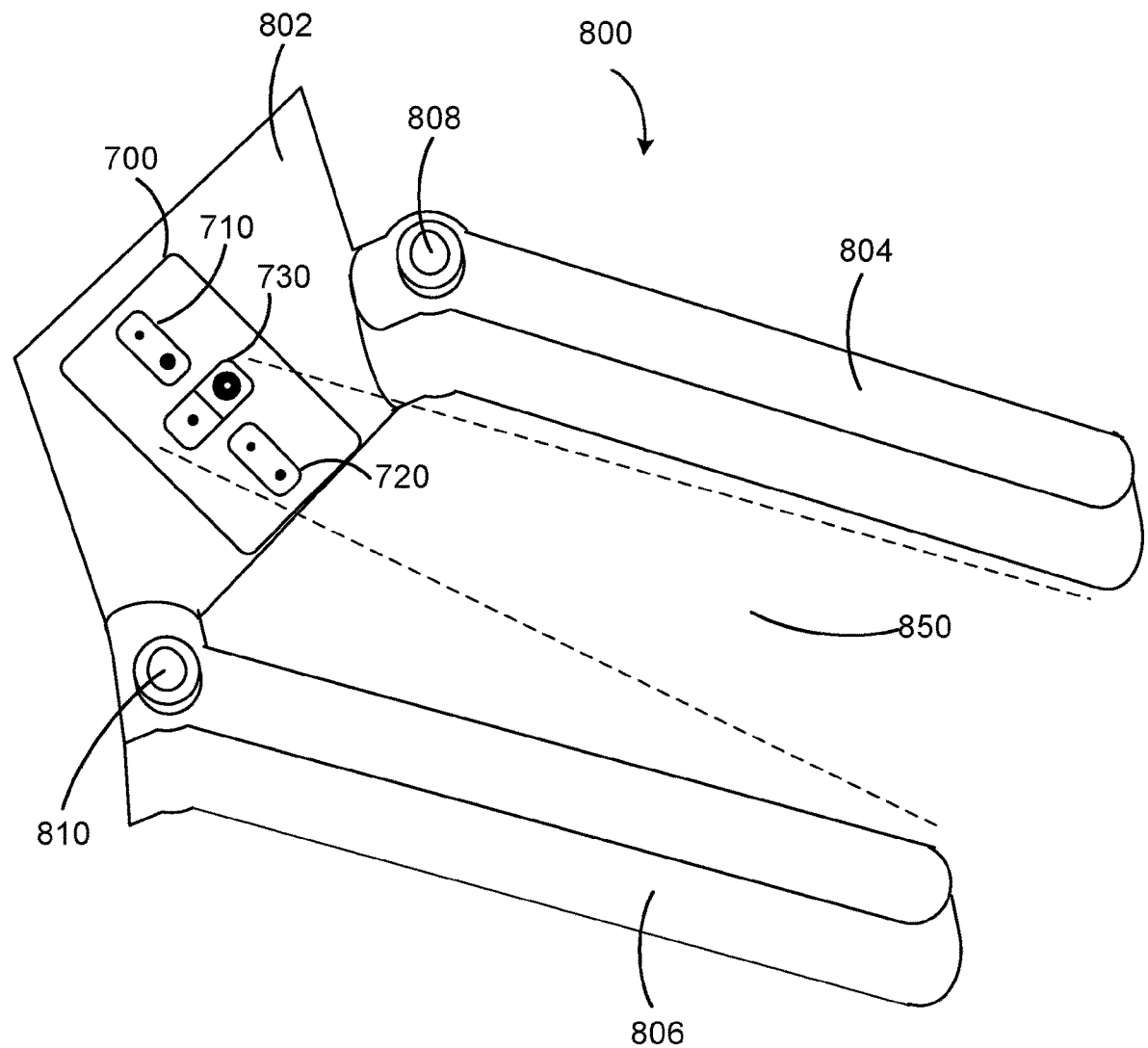
FIG. 8 illustrates a robotic gripper with a sensing device on the palm, in accordance with example embodiments.

FIG. 8 illustrates a robotic gripper with a sensing device on the palm, in accordance with example embodiments. More specifically, a robotic gripper 800 includes the PCB 700 from FIG. 7 affixed to a palm 802 of the robotic gripper 800. The robotic gripper 800 additionally includes opposable digits 804, 806. The digits 804, 806 may be configured to rotate towards and away from each other using respective rotational joints 808, 810. Such a motion may be initiated by a control system of a robot to cause the digits 804, 806 to grasp an object within a region 850 between digits 804, 806. Further example embodiments include more than two digits (e.g., three, four, or five digits) or only a single digit (e.g., a hook gripper)

The non-contact sensors on PCB 700, including short-range time-of-flight sensor 710, long-range time-of-flight sensor 720, and infrared camera 730, may therefore be oriented on palm 802 in order to generate sensor data in a direction between digits 804, 806. The sensor data may be indicative of objects with region 850, including objects near the palm 802 and near the tips of digits 804, 806. The sensor data may also be indicative of objects that are beyond the tips of digits 804, 806. Each non-contact sensor on PCB 700 may generate sensor data for a different specific region in the general direction between digits 804, 806.

As shown in FIG. 8, PCB 700 may be arranged on palm 802 so that short-range time-of-flight sensor 710, long-range time-of-flight sensor 720, and infrared camera 730 are aligned vertically. In other embodiments, PCB 700 may be arranged on palm 802 so that short-range time-of-flight sensor 710, long-range time-of-flight sensor 720, and infrared camera 730 are aligned horizontally, or in a different manner.

In some examples, PCB 700 may interface with a sensor board that services a force-torque sensor on a wrist that is coupled to the palm 802 of the gripper 800. The wrist may be configured to move the palm 802 and/or gripper 800 in one or more degrees of freedom. As an example, the force-torque sensor may be configured to measure forces and torques on the wrist in six degrees of freedom. Data from the force-torque sensor may be used to learn information about grasp quality or information about an object being grasped. In some examples, data from the force-torque sensor may be fused with data from one or more non-contact sensors on the gripper.

Although not shown in FIG. 8, in some embodiments, digits 804, 806 may be underactuated digits such as described in reference to FIGS. 4 and 5. Additionally, data from one or more encoders may be used to determine torque, velocity, and/or position information about the digits 804, 806, such as described in reference to FIGS. 4 and 5. Such data may be fused with data from other sensors as well, including non-contact sensors. In further examples, additional camera data from a head-mounted camera may be used as well.

An example embodiment of the present disclosure is a robotic device including a number of components. The components include a robotic gripping device, which includes a palm, a plurality of digits coupled to the palm, a time-of-flight sensor arranged on the palm such that the time-of-flight sensor is configured to generate time-of-flight distance data in a direction between the plurality of digits, and an infrared camera arranged on the palm such that the infrared camera is configured to generate grayscale image data in the direction between the plurality of digits. In addition, the robotic device includes a control system. The control system includes one or more processors, a non-transitory computer-readable memory, and program instructions stored on the non-transitory computer-readable memory executable by the one or more processors to carry out one or more actions. The actions may relate to controlling the robotic gripping device based on the time-of-flight distance data and the grayscale image data.

In further examples, the robot may include a robot arm that has the gripping device as an end effector. In some examples, the robot arm may be a standalone robot arm (e.g., a six degree-of-freedom robot arm) with a fixed base. In other examples, the robot arm may be separately attached to a robot body, which may be separately mobile within the environment. Within examples, the robot arm may or may not have a separate control system.

Figure 9:
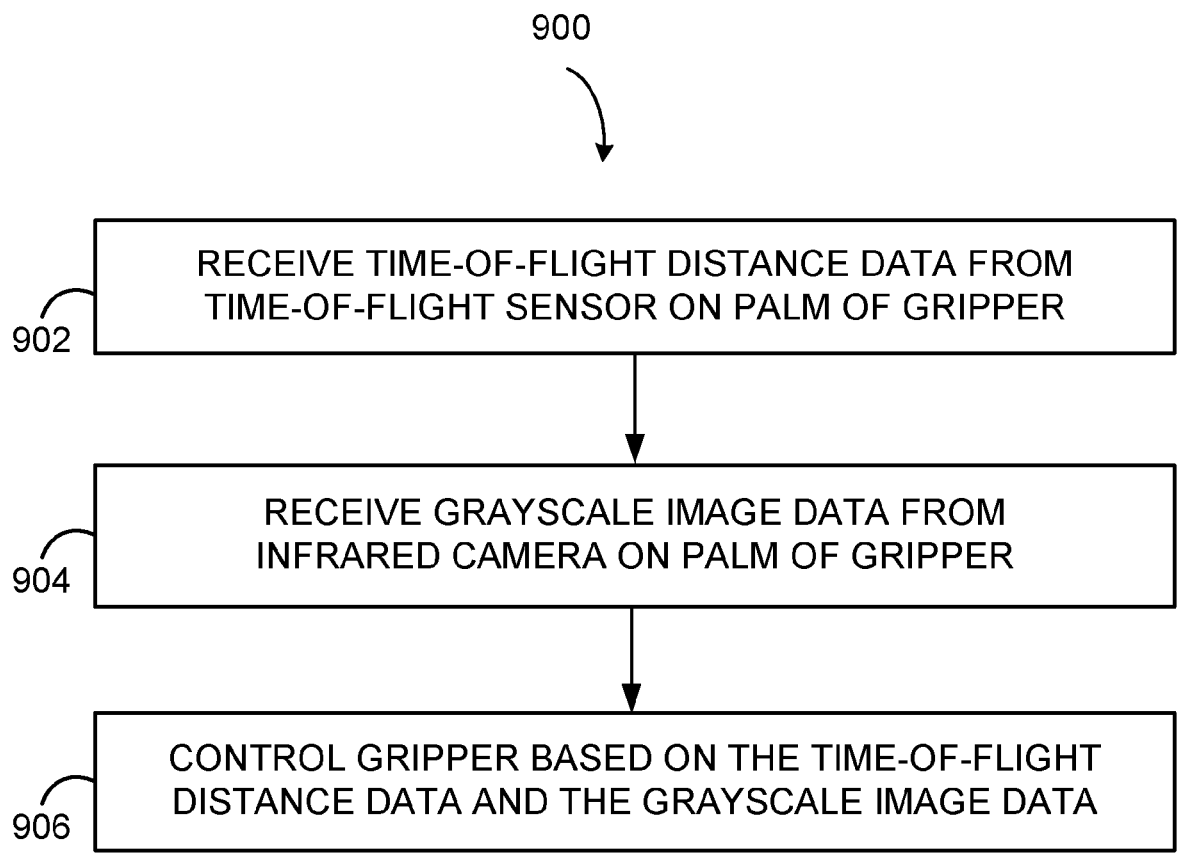
FIG. 9 is a block diagram of a method, in accordance with example embodiments.

FIG. 9 is a block diagram of a method, in accordance with example embodiments. The method 900 may be performed by a control system operating a sensorized robotic gripping device. The method 900 may involve use of any of the robotic gripping devices described and/or illustrated herein, including gripper 800 of FIG. 8, but may be applied to other robotic gripping devices having different arrangements and/or different components than those explicitly identified herein. Further, method 900 may be carried out by one or more remote or local control systems of a robotic system, a robotic arm, or a different type of robotic device.

Those skilled in the art will understand that the block diagram of FIG. 9 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 902, method 900 may include receiving time-of-flight distance data from a time-of-flight sensor on the palm of the gripper. The data may be indicative of a direction from the palm of the gripper toward an area between a plurality of digits (e.g., two opposable digits) of the gripper. The time-of-flight distance data may include a distance measurement to a nearest object in the direction toward the area between the digits. The distance measurement may be based on amount of time that it takes a projected laser light to return to the time-of-flight sensor. In some examples, time-of-flight reflectance data may also be received from the time-of-flight sensor based on a measurement of total activity returned during the distance measurement. In further examples, time-of-flight distance data may be received from multiple time-of-flight sensors on the palm, with each time-of-flight sensor possibly having a different range of detection.

At block 904, method 900 may include receiving grayscale image data from an infrared camera on the palm of the gripper. The image data may also be indicative of a direction from the palm of the gripper toward an area between a plurality of digits of the gripper. The image data may be generated by illuminating an area between the digits with infrared radiation with an infrared illumination source, and detecting the illuminated area with an infrared sensitive receiver. The grayscale image may include some number of pixels (e.g., 60×60), where each pixel represents an intensity of detected infrared and/or visible light.

At block 906, method 900 may further include controlling the gripper based on the time-of-flight distance data and the grayscale image data. More specifically, data from the time-of-flight sensor and the infrared camera may be fused together, possibly in addition to data from other sensors, in order to generate control instructions for the gripper. The data fusion may involve heuristics-based and/or machine learning models. The control instructions may relate to a first temporal phase before grasping an object (e.g., identifying an object to grasp, approaching the object, determining an appropriate stopping distance, and/or visual servoing). The control instructions may also relate to a second temporal phase after an attempted grasp (e.g., confirming grasp success, evaluating quality of the grasp, and/or determining properties of the object). The control instructions may also relate to a third temporal phase after a successful grasp (e.g., slip detection while moving a grasped object).

FIG. 10 illustrates bus timing for a sensing device, in accordance with example embodiments. In some examples, software components related to operating a sensor device (such as the one illustrated in FIG. 7) include embedded sensor drivers, an embedded device driver, realtime sensor drivers, an EtherCAT device driver, and a realtime controller. The basic flow of data may be asynchronous data acquisition on an embedded target over an inter-integrated circuit (I2C) and/or serial peripheral interface bus (SPI). This data is then packed and sent over EtherCat to the realtime system and handled by a synapse delegate device. The device is in turn handled by a realtime controller that publishes IPC messages for non-realtime consumption.

In reference to FIG. 10, table 1002 illustrates example bus timing to packetize data from two time-of-flight sensors and an infrared microcamera. The force-torque (F/T) analog-to-digital conversion (ADC) requires constant polling of the digital signal processor (DSP) to check if new data is available. This thread is only interrupted by an interrupt request (IRQ) set for when the first-in, first-out buffer is near full for the SPI bus handling the microcamera. The I2C bus handling the time-of-flight sensors is given lower priority and therefore only runs at the end of the F/T ADC read.

Data over EtherCAT is then packetized to consist of two time-of-flights (each with distance and reflectance) with 900 bytes of the 60×60 grayscale image. In one example, the system may be designed for 250 Hertz (Hz), which roughly means a new camera image every >10 Hz.

V. Example Object-in-Hand Classifiers

As previously noted, sensor data of multiple different modalities may be leveraged to ascertain whether or not an attempted grasp was successful. In particular, multimodel sensor data from one or more non-contact sensors on the palm of a gripper may be input into an object-in-hand classifier to determine the result of an attempted grasp. Using multiple types of non-contact sensor data may be particularly beneficial for underactuated grippers, for which determining grasp success or failure can be more challenging.

To evaluate the performance of different types of non-contact sensors on the gripper, data acquired for a variety of grasp types has been considered. Results indicate that the short-range time-of-flight sensor is most useful for detecting objects within the length of the gripper digits, while the long-range time-of-flight sensor is most useful for detecting objects farther than the tip of the gripper digits. The infrared camera is particularly useful for determining occlusions, and for classifying objects in the gripper. Results indicate that in some examples, data from the time-of-flight sensors alone may not be sufficient for determining grasp occupancy.

Figure 11:
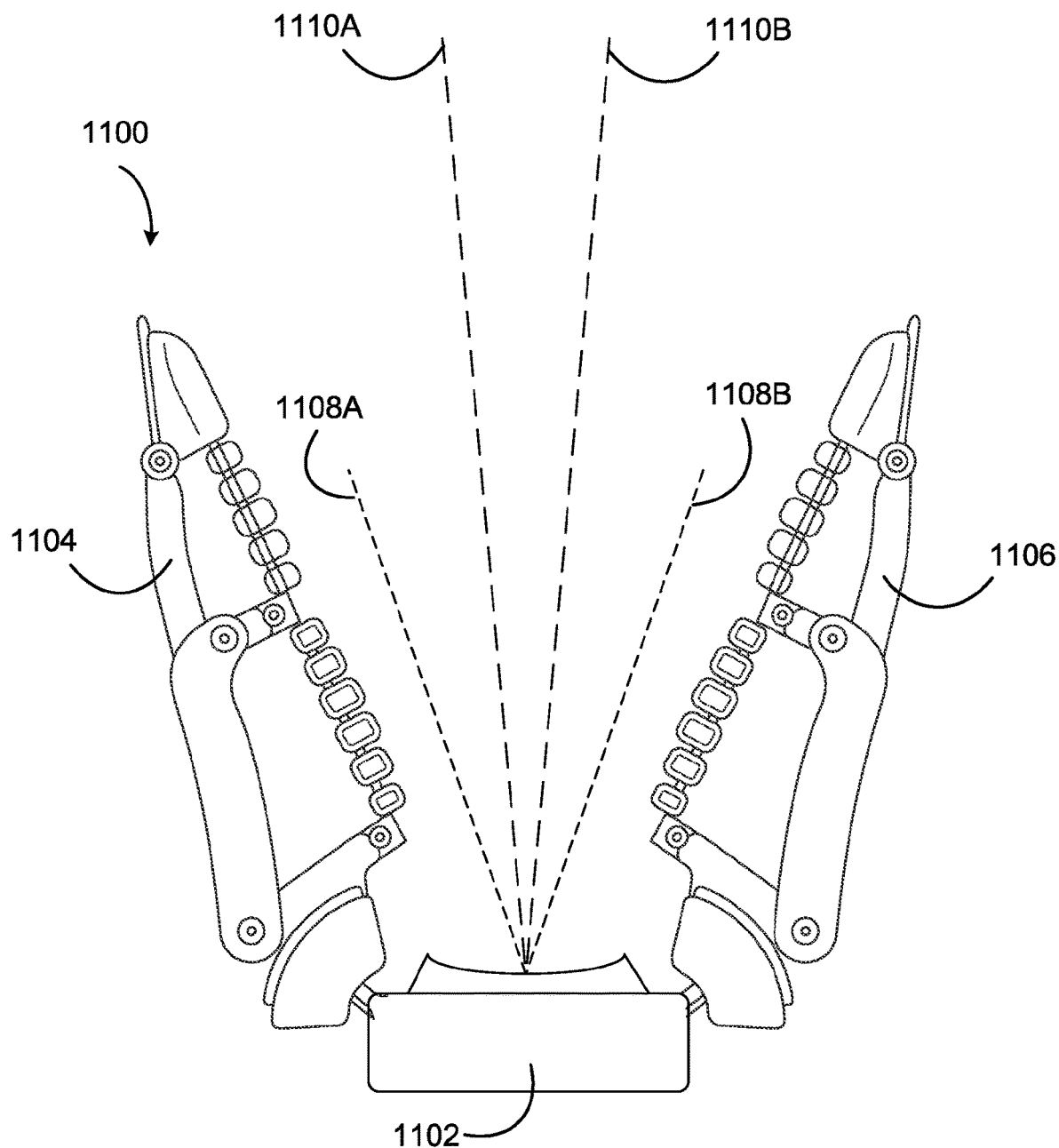
FIG. 11 illustrates fields of view for time-of-flight sensors on a robotic gripper, in accordance with example embodiments.

FIG. 11 illustrates fields of view for two time-of-flight sensors on a robotic gripper, in accordance with example embodiments. More specifically, gripper 1100 may be an underactuated gripper with a palm 1102 that is coupled to each underactuated digit 1104, 1106 by a respective rotational joint. The palm may additionally include two time-of-flight sensors, a short-range time-of-flight sensor and a long-range time-of-flight sensor.

The short-range time-of-flight sensor may have a field-of-view defined by dashed lines 1108A and 1108B. The long-range time-of-flight sensor may a have a field-of-view defined by dashed lines 1110A and 1110B. As shown in FIG. 11, the short-range sensor may have a wider field-of-view that does not extend as far from palm 1102. In some examples, the range of the short-range sensor may not extend past the tips of underactuated digits 1104, 1106. The long-range sensor may have a narrower field-of-view that extends further from palm 1102. As an example, the short-range sensor may have a field of view of 40 degrees and a range that extends 20 centimeters from palm 1102, while the long-range sensor may have a field of view of 25 degrees and a range that extends 200 centimeters from palm 1102.

Including multiple time-of-flight sensors with different ranges may allow for better sensing across a range of gripper operations, including pre-grasp and post-grasp operations. In terms of determining grasp failure or success, experimental results indicate that the short-range sensor has better fidelity than the long-range sensor. In some examples, both distance and reflectance values from a given time-of-flight sensor may be considered to evaluate grasp success. An object-in-hand classifier that takes as input sensor data of multiple modalities may have better accuracy.

Figure 12:
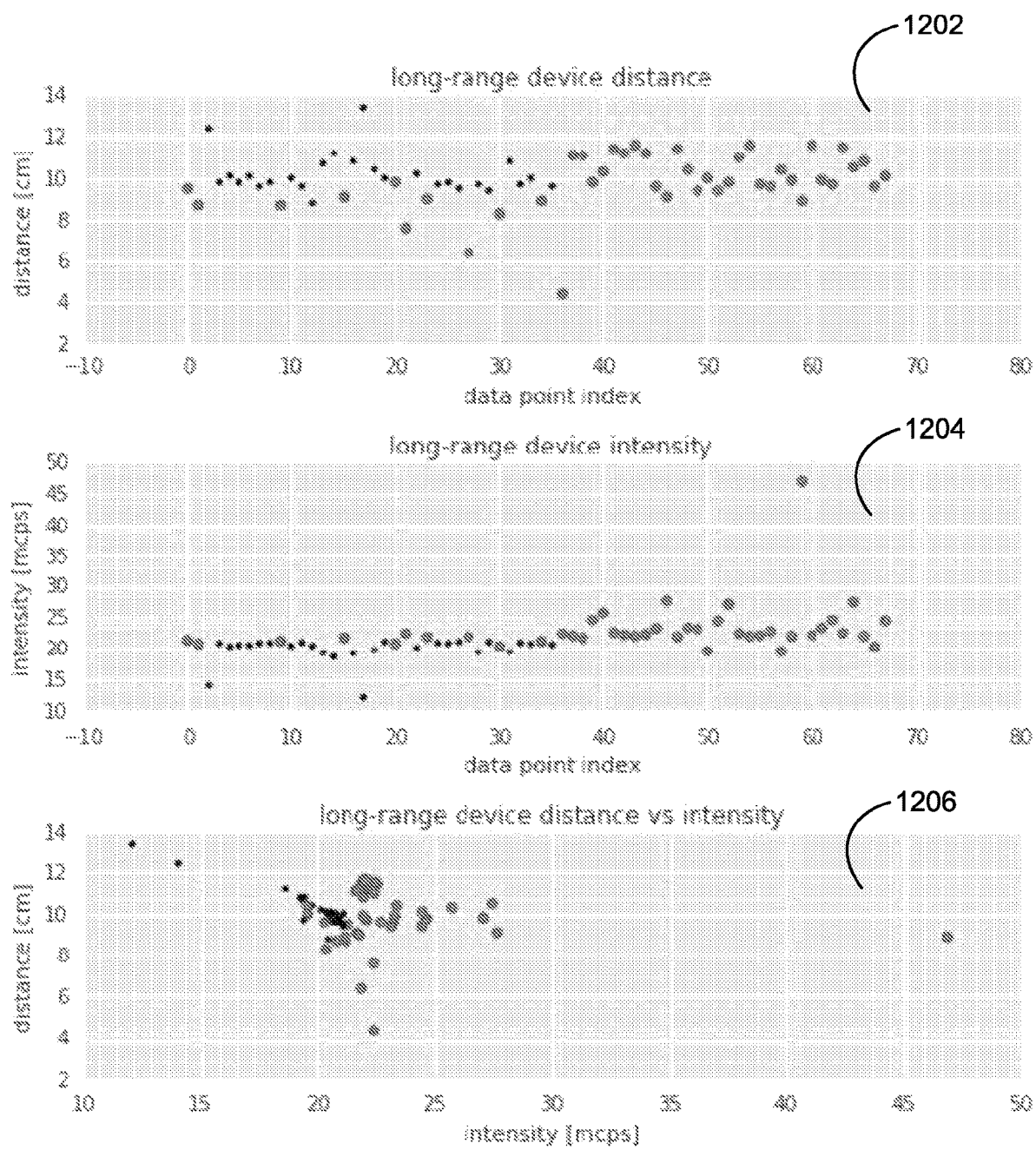
FIG. 12 illustrates long-range time-of-flight sensor data, in accordance with example embodiments.

FIG. 12 illustrates long-range time-of-flight sensor data, in accordance with example embodiments. In particular, plot 1202 illustrates distance measurements in centimeters from the long-range sensor across a selection of samples. The larger dots in plot 1202 represent cases where an object was in the gripper, while the smaller dots in plot 1202 represent cases where the gripper was empty. As can be seen from plot 1202, the cases where an object was in the gripper are not easily distinguishable from cases where the gripper was empty when considering only distance data from the long-range time-of-flight sensor.

Additionally, plot 1204 illustrates reflectance measurements in mega-counts per second from the long-range sensor across the same selection of samples. As can be seen from plot 1204, the cases where an object was in the gripper are also not easily distinguishable from cases where the gripper was empty when considering only reflectance data from the long-range time-of-flight sensor.

Finally, plot 1206 illustrates both the distance and intensity measurements from the long-range time-of-flight sensor in a single plot. In particular, the samples are plotted as ordered pairs representing (intensity, distance). As can be seen from plot 1206, the combination of distance and intensity measurements from the long-range time-of-flight sensor also does not produce easily separable collections of examples where the gripper is holding an object.

Figure 13:
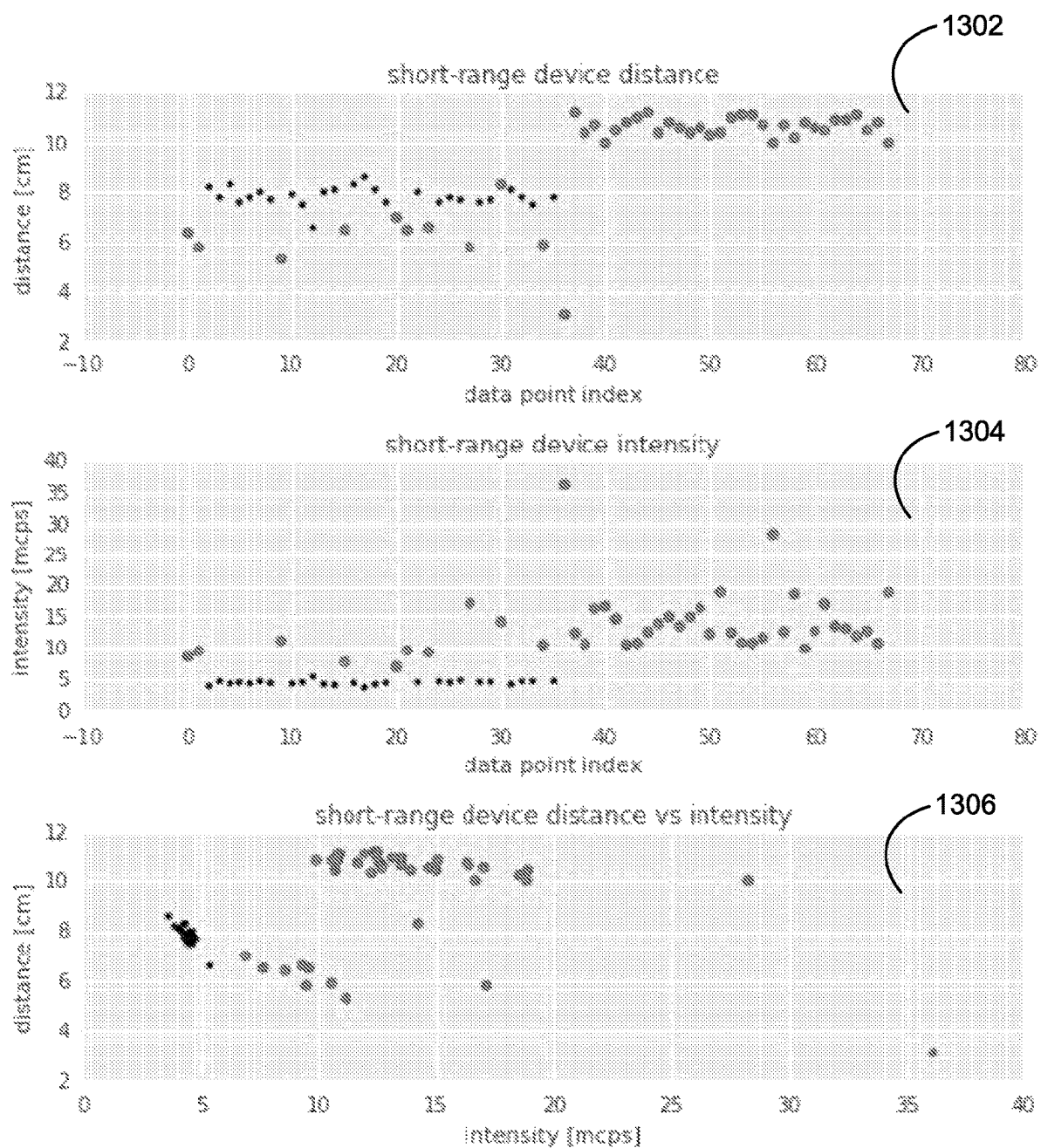
FIG. 13 illustrates short-range time-of-flight sensor data, in accordance with example embodiments.

FIG. 13 illustrates short-range time-of-flight sensor data, in accordance with example embodiments. In particular, plot 1302 illustrates distance measurements in centimeters from the short-range sensor across the same selection of samples as illustrated for the long-range sensor in FIG. 12. The larger dots in plot 1302 again represent cases where an object was in the gripper, while the smaller dots in plot 1302 represent cases where the gripper was empty. As can be seen from plot 1302, the cases where an object was in the gripper are often distinguishable from cases where the gripper was empty when considering only distance data from the short-range time-of-flight sensor. However, there are cases where the distance data alone may not be sufficient to distinguish successful grasps from failed grasps.

Additionally, plot 1304 illustrates reflectance measurements in mega-counts per second from the short-range sensor across the same selection of samples. As can be seen from plot 1304, the cases where an object was in the gripper are often distinguishable from cases where the gripper was empty when considering only reflectance data from the short-range time-of-flight sensor. However, there are cases where the reflectance data alone may not be sufficient to distinguish successful grasps from failed grasps.

Finally, plot 1306 illustrates both the distance and intensity measurements from the short-range time-of-flight sensor in a single plot. In particular, the samples are plotted as ordered pairs representing (intensity, distance). As can be seen from plot 1306, the combination of distance and intensity measurements from the short-range time-of-flight sensor produces separable collections of examples to distinguish when the gripper is holding an object.

The combination of both time-of-flight distance data and time-of-flight reflectance data may therefore be used as input data for an object-in-hand classifier to accurately determine grasp failure or success in many cases. However, in some examples, there may be still be corner cases that are difficult for a time-of-flight sensor to distinguish. As an example, a top-grasp on a cup may be difficult to resolve with only time-of-flight sensor data. Some such examples may be more easily resolvable with camera data.

Figure 14:
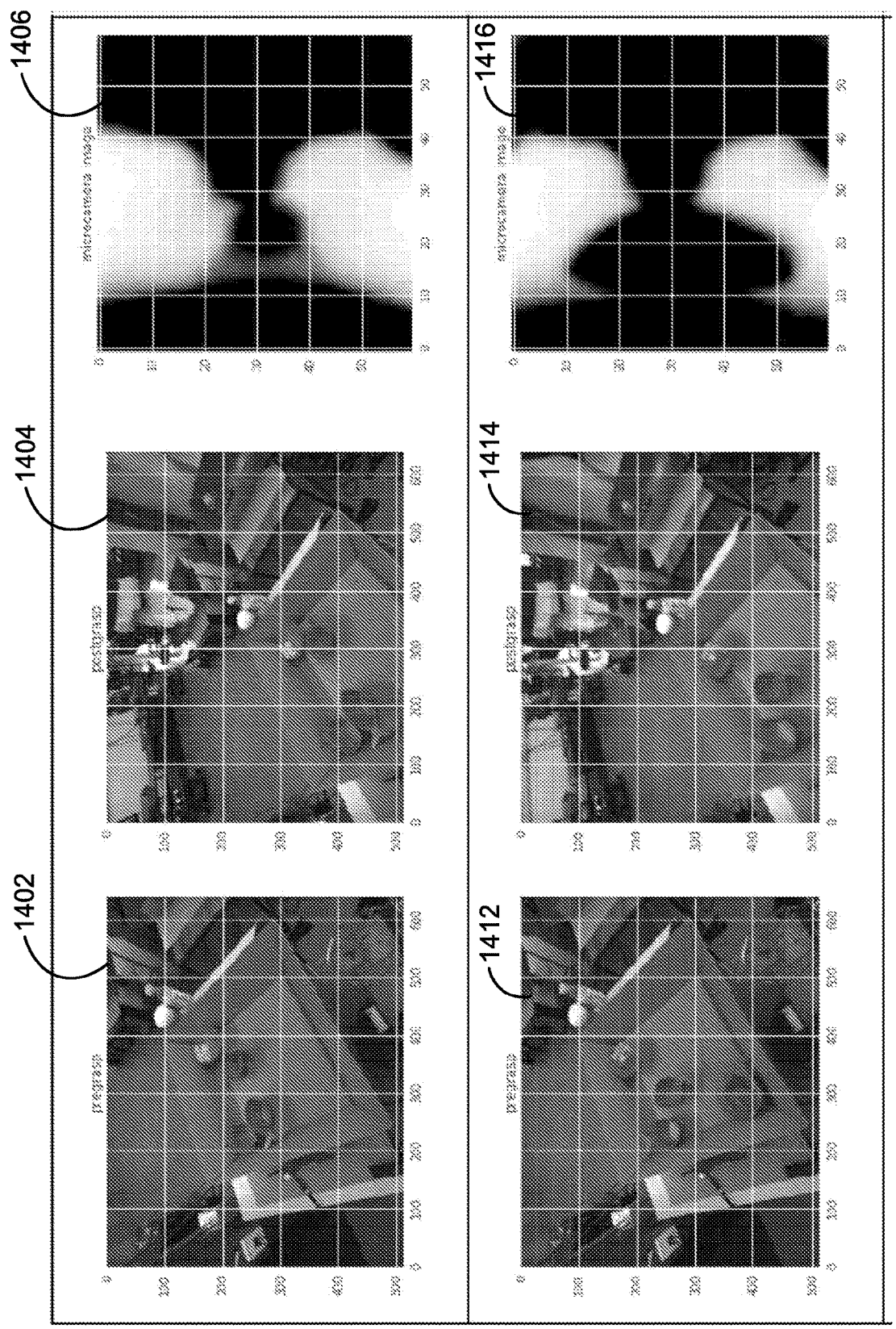
FIG. 14 illustrates camera image data, in accordance with example embodiments.

FIG. 14 illustrates camera image data, in accordance with example embodiments. More specifically, image 1402 shows an environment containing an object for a robotic gripper to attempt to grasp. Image 1404 shows an empty robotic gripper after a failed grasp attempt. Each of image 1402 and 1404 may be collected from a sensor remote from the gripper (e.g., a head-mounted camera). In some examples, sensor data from such a sensor may not be sufficient to accurate determine grasp success or failure. Image 1406 is a microcamera image from a camera in the palm of the gripper after the failed grasp attempt. More specifically, image 1406 is a 60×60 grayscale image collected from an infrared microcamera in the palm of the gripper. In image 1406, the dark areas correspond with gripper digits, while the light areas are free space.

Image 1412 again shows an environment containing an object for a robotic gripper to attempt to grasp. In this case, image 1414 shows an object held by the robotic gripper after a successful grasp attempt. Each of image 1412 and 1414 may be again collected from a sensor remote from the gripper. Image 1416 is another microcamera image from the camera in the palm of the gripper after the successful grasp attempt. In image 1416, the dark areas correspond with gripper digits or the object, while the light areas are free space.

In this case, a grasp failure is easily distinguishable from a grasp success using the images 1406 and 1416 from the infrared microcamera in the palm of the gripper (e.g., by using an image subtraction heuristic). However, in some examples, there may also be cases which are difficult for the camera to distinguish, but more easily resolvable using distance and/or reflectance data from a time-of-flight sensor.

Figure 15:
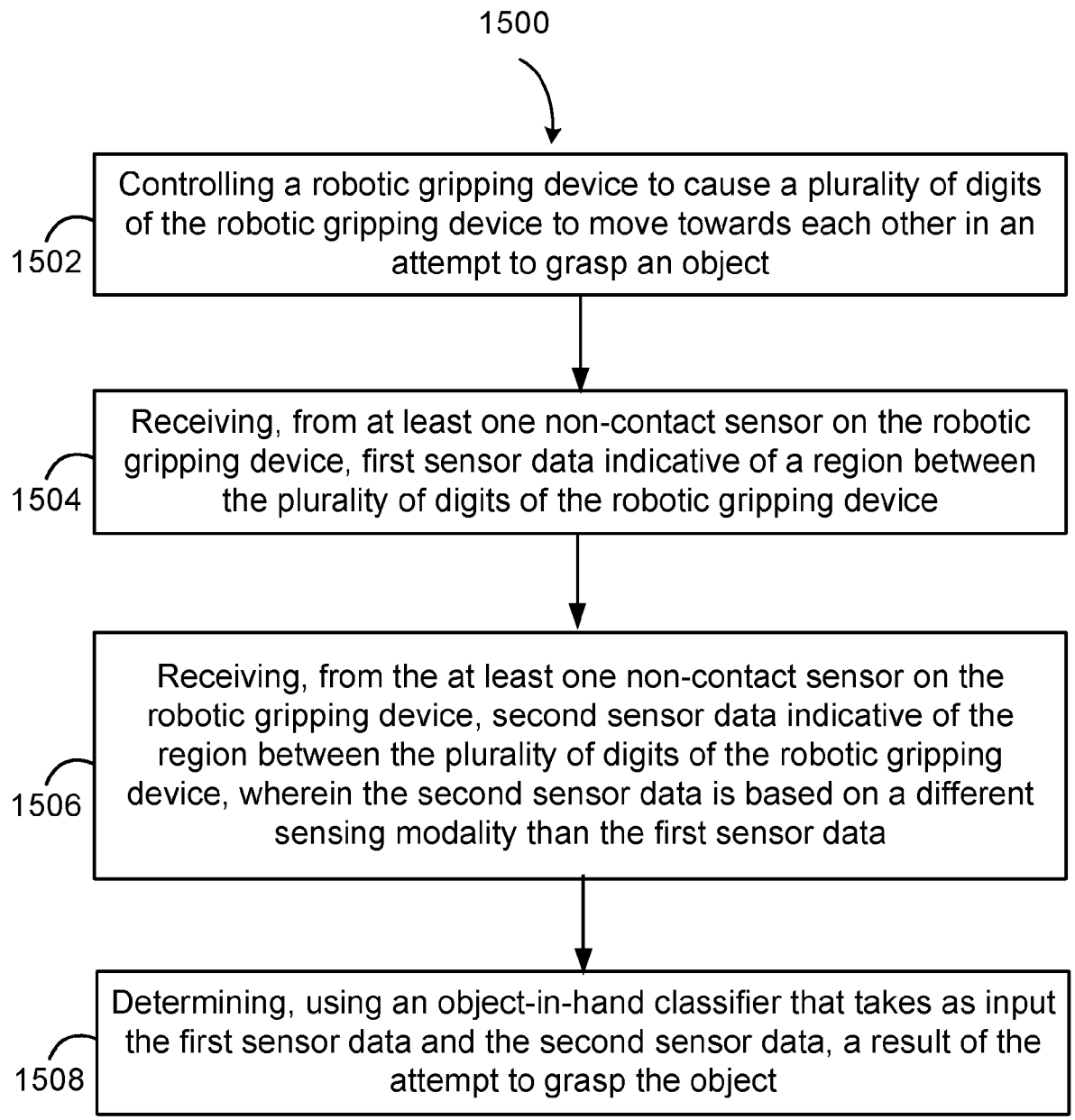
FIG. 15 is a block diagram of another method, in accordance with example embodiments.

FIG. 15 is a block diagram of another method, in accordance with example embodiments. The method 1500 may be performed by a control system operating a sensorized robotic gripping device. The method 1500 may involve use of any of the robotic gripping devices described and/or illustrated herein, including gripper 800 of FIG. 8, but may be applied to other robotic gripping devices having different arrangements and/or different components than those explicitly identified herein. Further, method 1500 may be carried out by one or more remote or local control systems of a robotic system, a robotic arm, or a different type of robotic device.

Those skilled in the art will understand that the block diagram of FIG. 15 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 1502, the method 1500 may include controlling a robotic gripping device to cause a plurality of digits of the robotic gripping device to move towards each other in an attempt to grasp an object. More specifically, a control system of a robot may identify an object in the environment for the gripper to pick up based on sensor data from one or more sensors remote from the gripper and/or on the gripper. The control system may then move the gripper to a position where the object is between the digits (e.g., two opposable digits) before actuating the digits to attempt to grasp the object. In some examples, imperfect perception information, unexpected object properties, unexpected environmental conditions, and/or other factors may cause a grasp attempt to fail.

Causing the digits to move towards each other in an attempt to grasp the object may involve rotational motion of the digits, translational motion of the digits, or a combination of rotational and translational motion of the digits. In some examples, one or more of the digits may be underactuated digits, in which case it may not be possible to determine full positioning information for all of the joints of the digits during the grasp attempt. Non-contact sensors positioned in the gripper may be particularly useful for evaluating grasp success when the gripper includes underactuated digits.

At block 1504, the method 1500 may include receiving, from at least one non-contact sensor on the robotic gripping device, first sensor data indicative of a region between the plurality of digits of the robotic gripping device. More specifically, a first non-contact sensor may be positioned on the palm of the gripper and oriented to detect objects that are located between the digits. As an example, the first non-contact sensor may be a one-dimensional time-of-flight sensor configured to generate a time-of-flight distance measurement indicative of distance to a nearest object in the direction between the digits of the gripper.

At block 1506, the method 1500 may include receiving, from the at least one non-contact sensor on the robotic gripping device, second sensor data indicative of the region between the plurality of digits of the robotic gripping device. The second sensor data may be based on a different sensing modality than the first sensor data. A sensing modality refers to a form of sensory perception that produces a particular form of sensor data. By receiving sensor data with multiple different non-contact sensing modalities, a more accurate evaluation of grasp success may be obtained.

In some examples, the same sensor may generate both the first sensor data and the second sensor data. For instance, a time-of-flight sensor may be configured to generate a distance measurement as well as a separate reflectance measurement indicative of total activity returned during the distance measurement. Sensor data of both modalities (one-dimensional time-of-flight distance data and reflectance data) may be used to evaluate grasp success.

In further examples, a first sensor may generate the first sensor data and a second sensor may generate the second sensor data. For instance, the first sensor may be a time-of-flight sensor configured to generate time-of-flight sensor data and the second sensor may be an infrared microcamera configured to generate grayscale image data. A time-of-flight sensor and an infrared camera may be particularly effective for resolving corner cases that may be missed by one or the other of the two sensors.

In yet further examples, sensor data of more than two modalities may be received and used as input into an object-in-hand classifier. In some examples, time-of-flight distance data, time-of-flight reflectance data, and infrared image data may each be received and used to evaluate grasp success. In further examples, multiple time-of-flight sensors (e.g., a short-range time-of-flight sensor and a long-range time-of-flight sensor) may each provide distance and/or reflectance data for an object-in-hand classifier.

In additional examples, other types of non-contact sensor data may also be used as input data to an object-in-hand classifier as well or instead. Further example embodiments may include the use of ultrasonic sensing that measures distance using sound waves, electromagnetic sensing, radar sensing, and/or structured light sensing.

At block 1508, the method 1500 may include determining, using an object-in-hand classifier that takes as input the first sensor data and the second sensor data, a result of the attempt to grasp the object. An object-in-hand classifier is an algorithm or function that maps inputted sensor data to categories corresponding to different grasp states. In some examples, the output of the object-in-hand classifier is a binary output indicating whether or not an attempted grasp was successful (e.g., whether or not the gripper is currently holding the targeted object). In further examples, the output of the object-in-hand classifier may indicate grasp quality (e.g., what portions of the digits are in contact with object to determine quality of grip), intrinsic properties of the object, and/or other information. Within examples, the object-in-hand classifier may rely on a machine learning model, a heuristics-based approach, or a combination of both.

A machine learning model may allow for the prediction of grasp success or failure based on sensor data without explicit programming for a particular grasp scenario. In some examples, a supervised learning model may be used that has been trained based on correctly identified observations. In further examples, a model used by a robot for a particular gripper may be trained using past grasp attempts by the robot with the particular gripper. In other examples, a model trained with data from a gripper on one robot may then be used by a different robot with another similar gripper. Notably a machine learning model may transfer better than a heuristics-based approach when applied to a robot with different digits, a robot having digits with different levels of use or wear, and/or a robot with a different operating environment. In some examples, a remote computing device (e.g., a cloud-based server) may compile information from multiple robots using similar grippers to train a model that is then used to determine grasp outcomes for the same robots and/or other robots. In further examples, simulated grasp attempts on models of different objects may be performed in software, and also used to train a machine learning model.

In some examples, a support vector machine (SVM) is a supervised learning model that may be used for the object-in-hand classifier. An SVM is non-probabilistic binary linear classifier, making it a particularly appropriate model to use when the only desired output is whether or not a grasp attempt failed (e.g., the gripper is holding the object or the gripper is not holding the object). Given a set of training examples, each marked as belonging to one or the other of two categories, an SVM training algorithm may build a model that assigns new examples to one category or the other. More specifically, a training example in this case may include at least two different modalities of sensor data from at least one non-contact sensor on the gripper, and the two categories may correspond to grasp success and grasp failure.

In some examples, an SVM may take as input a time-of-flight distance measurement and a time-of-flight reflectance measurement from a single time-of-flight sensor (e.g., a short-range time-of-flight sensor). In further examples, an SVM may take as input a time-of-flight distance measurement, a time-of-flight reflectance measurement, and an infrared image from an infrared microcamera. In further examples, an SVM may take as input sensor data from a force-torque sensor on the wrist, position and/or torque data from one or more encoders associated with underactuated digits, sensor data from an IMU sensor on the palm, and/or other types of sensor data in addition to multimodal non-contact sensor data.

In further examples, other types of machine learning models may be used. For instance, a neural network may be trained that takes as input any of the types of sensor data described for an SVM. In some examples, a convolutional neural network (CNN) may be used as the object-in-hand classifier. A CNN typically consists of an input and an output layer, as well as multiple hidden layers. The hidden layers of a CNN typically include convolutional layers, pooling layers, fully connected layers and/or normalization layers. A CNN uses less pre-processing than some other image classification algorithms and learns filters that may need to be manually engineered with other algorithms. A CNN therefore has the advantage of independence from prior knowledge and human effort in feature design. In yet other examples, a heuristics-based approach with hard-coded buckets for different combinations of sensor data may be used as well or instead.

In additional examples, method 1500 may involve further operations based on the determined result of the attempt to grasp the object. For instance, if the grasp is determined to be unsuccessful, the gripper may be controlled to make another grasp attempt. If the grasp is determined to be successful, the gripper may be controlled to move the object to a dropoff location. In some examples, the control system may receive additional sensor data and subsequently determine whether or not the object-in-hand classifier correctly resolved a particular scenario. This information may be used to refine the object-in-hand classifier (e.g., train a machine learning model).

In further examples, the object-in-hand classifier may also be used as a dropped object detector to determine when a successfully grasped object is no longer being held by the gripper (e.g., because the robot has dropped the object or the object has been taken from the robot). In additional examples, the object-in-hand classifier may also be used to confirm that an object has been received in the gripper from a user (e.g., taken from the user's hand). In further examples, the object-in-hand classifier may periodically be used to confirm that an object is still being held by the gripper (e.g., every five seconds while moving a grasped object). If the object-in-hand classifier indicates that the object is unexpectedly no longer being held by the gripper, a control system may cause the robot to perform one or more corrective actions (e.g., to locate and pick up a dropped object).

Figure 16:
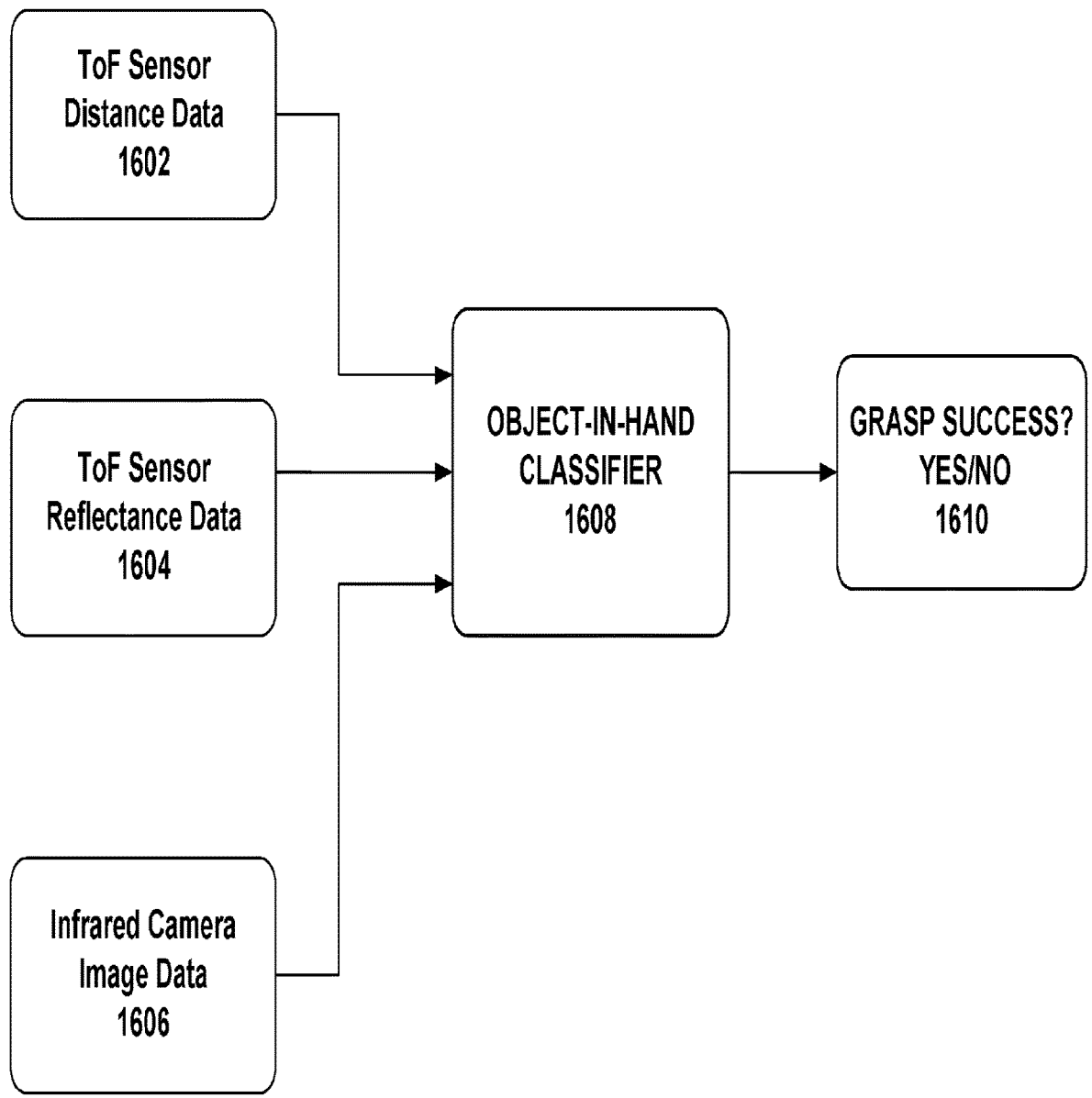
FIG. 16 is a block diagram illustrating application of an object-in-hand classifier, in accordance with example embodiments.

FIG. 16 is a block diagram illustrating application of an object-in-hand classifier, in accordance with example embodiments. In particular, distance data 1602 from a time-of-flight sensor may be captured by a time-of-flight sensor and used as input data to an object-in-hand classifier 1608. The distance data 1602 may be a single distance measurement (e.g., measured in centimeters from a time-of-flight sensor on a palm of a gripper).

Additionally, reflectance data 1604 may also be received from the same time-of-flight sensor and used as additional input data to the object-in-hand classifier 1608. The reflectance data 1604 may be a single reflectance measurement indicating a return signal rate during the distance measurement (e.g., a return signal count divided by a convergence time, measured in mega-counts per second).

Additionally, image data 1606 may be received from an infrared camera and used as additional input data to the object-in-hand classifier 1608. The image data 1606 may be a single image captured by the infrared camera (e.g., a grayscale image with 60×60 pixels). The image data 1606 may be captured at the same time as the time-of-flight sensor data, or a different time.

The object-in-hand classifier 1608 may provide a binary grasp success output 1610 based on the distance data 1602, the reflectance data 1604, and the image data 1606. In some examples, the object-in-hand classifier 1608 may be a machine learning model. More specifically, the object-in-hand classifier 1608 may be a supervised learning model such as an SVM. In other examples, the object-in-hand classifier 1608 may be a different type of machine learning model like a neural network (e.g., a convolutional neural network or another deep neural network structure). In further examples, the object-in-hand classifier 1608 may be a heuristics-based model with a hardcoded function to determine the grasp success output 1610 based on the input data. Specific example embodiments of an object-in-hand classifier include heuristic thresholding, a linear SVM, a radial basis SVM, a wide fully-connected neural network, a deep fully-connected neural network, and a hybrid CNN with wide fully-connected neural network.

Figure 17:
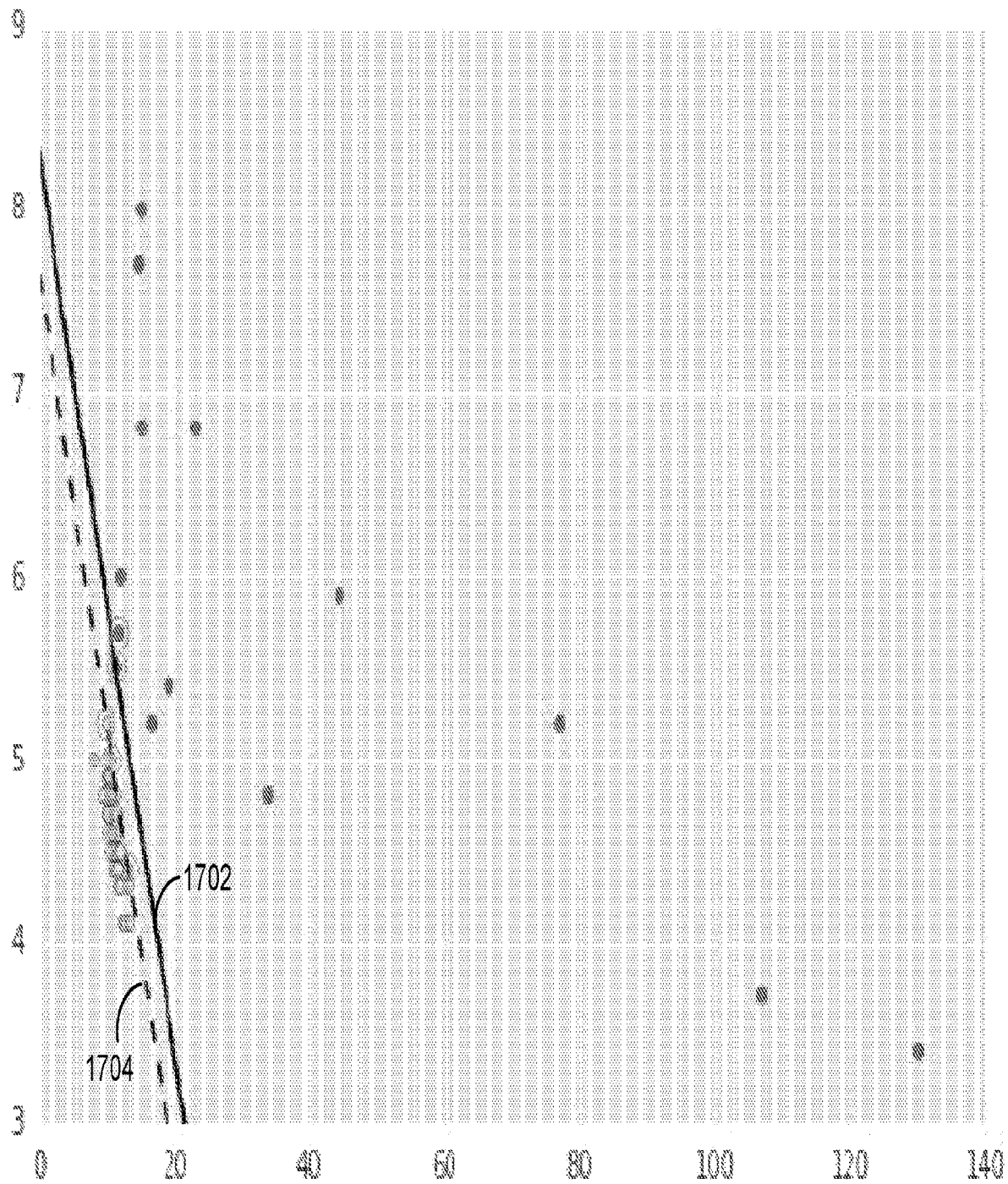
FIG. 17 illustrates a linear kernel support vector machine (SVM), in accordance with example embodiments.

FIG. 17 illustrates a linear kernel support vector machine (SVM), in accordance with example embodiments. More specifically, a trained SVM has an associated separator 1702 used to distinguish points as either successful or unsuccessful grasps based only on intensity (reflectance) and distance measurements from a short-range time-of-flight sensor. The separator 1702 is a hyperplane, which in the case of a linear kernel SVM is a line in two-dimensional space. The darker points represent time-of-flight distance and intensity measurements for successful grasps and the lighter points represent time-of-flight distance and intensity measurements for unsuccessful grasps. The circled points represent the support vectors which define the position of the separator 1702. In this case, the margin of the SVM is the distance between dashed line 1704 and the separator 1702. The separator 1702 may be used to distinguish future grasp attempts as either successful or unsuccessful based on time-of-flight distance and intensity measurements.

On static data, in an example system as illustrated in FIG. 17, it has been possible to tune the parameters for an SVM using just the intensity (reflectance) and distance data from a short-range time-of-flight sensors to produce high-accuracy detection of 98%. Similar performance has also been achieved using an infrared camera and an image subtraction heuristic. By using a combination of the time-of-flight sensor data and the infrared camera data (and possibly other data such as gripper joint positions), an object-in-hand classifier may be trained that has a high level of accuracy with high robustness.

VI. Other Example Applications

Non-contact sensors in a robotic gripper may be used for a number of applications, including multiple phases of a gripping process. Before a grasp can be attempted, the sensor data may be used to help generate an approach trajectory for the gripper. In some examples, resolution issues and occlusions may make it difficult for a robot to rely only on sensors remote from the gripper to determine an approach trajectory. Accordingly, data from one or more non-contact sensors on the gripper such as an infrared camera and one or more time-of-flight sensors may be fused (possibly with other sensor data such as data from a head-mounted camera) to determine an approach trajectory and/or stopping points for the gripper.

In some examples, the sensor data may be used to help ensure that the robot doesn't knock over an object during approach by stopping the gripper at appropriate distance for grasping, rather than moving to contact. In some examples, one or more thresholds may be used to determine when to stop the gripper based on non-contact sensor data. In further examples, the thresholds may correspond to specific sensor types, object types, and/or grasp types. In some cases, a certain scenario may be easier for one sensor type to resolve than another. For instance, when doing a top grasp on an edge of a plastic cup, sensor data from an infrared camera may be more useful for determining when to stop the gripper than sensor data from a time-of-flight sensor. A heuristics-based or machine learning approach may be used to determine an appropriate stopping distance for the gripper using multimodal sensor data.

In further examples, non-contact sensing may also be used to control a visual servoing process to center the gripper over an object. More specifically, a closed-loop control system may involve using vision information to sequentially adjust the gripper position. For instance, certain features (e.g., edges) may be extracted from infrared images that are captured at multiple points as the gripper position is adjusted. Based on how much the features move between successive images, the gripper position may be adjusted. In some examples, a machine learning model may take as input sensor data of multiple different modalities (e.g., infrared image data and time-of-flight depth data) to control a visual servoing process. In further examples, multimodal sensor data may be used as part of a position-based servoing process or a velocity-based servoing process.

In additional examples, a robotic control system may use close-up non-contact sensor data to perform precise grasps on oddly shaped or small objects for which accurate bounding box information is unavailable (e.g., forks, pens, or post-it notes). In further examples, close-up non-contact sensor data may also be used to select a grasp point to grasp on a large object that may have local structure (e.g., a tissue box or stuffed animal). In additional examples, close-up non-contact sensor data may also be used before grasping a container like a bowl or cup to determine whether or not the container contains liquid or some other substance. A control system may then determine whether or not to grasp the container and/or how to grasp the container based on the sensor data. In further examples, close-up non-contact sensor data may additionally be used for classification of objects in clutter.

In some systems, sensorizing a robotic gripper with one or more non-contact sensors may allow for the removal of one or more previously required fiducial markers within the environment of a robot.

In further examples, sensor data from one or more non-contact sensors on a gripper may also be used for slip detection after grasping an object. In particular, motion of the robot's digits may be differentiated from motion of a grasped object to distinguish slipping from normal gripper motion. In some examples, slip detection may involve determining a velocity field from an image instead of using still frames (e.g., every pixel within the image may be assigned a separate velocity vector). By considering what points are moving within an image, unexpected or unintended object movement within the digits can be identified. In such cases, robot behavior may be adjusted to compensate (e.g., by increasing torque to try to prevent the object from slipping). A slip detector may involve a heuristics-based or machine learning approach. In some examples, a heuristics-based approach may only be used in situations where available computing power is not sufficient to resolve a possible object slipping situation in an available amount of time with a machine learning model. In further examples, a slip detector may take as input sensor data of multiple different modalities from at least one non-contact sensor on the gripper.

Other robotic applications may also benefit from having one or more non-contact sensors on the gripper. Many such applications may benefit from sensors that generate sensor data of multiple different modalities. Depending on the intended uses for a particular robot, different combinations of non-contact sensors may be considered.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A method comprising:
controlling one or more digits of a robotic gripping device to attempt to grasp an object;
receiving, from a first non-contact sensor positioned outside of the one or more digits of the robotic gripping device, first sensor data based on a first sensing modality, wherein the first sensor data is collected after the attempt to grasp the object;
receiving, from a second non-contact sensor positioned outside of the one or more digits of the robotic gripping device, second sensor data based on a second sensing modality different from the first sensing modality, wherein the second sensor data is collected after the attempt to grasp the object; and
determining, using a trained machine learning model that takes as input the first sensor data and the second sensor data and outputs a decision of whether the robotic gripping device is currently holding the object after the attempt to grasp the object, whether the robotic gripping device is currently holding the object after the attempt to grasp the object.

2. The method of claim 1, wherein the trained machine learning model has been trained based on past grasp attempts by the robotic gripping device.

3. The method of claim 1, wherein the trained machine learning model has been trained based on past grasp attempts by a similar robotic gripping device.

4. The method of claim 1, wherein the trained machine learning model has been trained based on simulated grasping events.

5. The method of claim 1, wherein the trained machine learning model comprises a convolutional neural network (CNN).

6. The method of claim 1, wherein the first non-contact sensor comprises a time-of-flight sensor, wherein the first sensor data comprises time-of-flight distance data from the time-of-flight sensor.

7. The method of claim 6, wherein the trained machine learning model is a linear kernel state vector machine (SVM) that takes as input the time-of-flight distance data.

8. The method of claim 1, wherein the first non-contact sensor is an infrared camera, wherein the first sensor data comprises grayscale image data, wherein the second non-contact sensor is a time-of-flight sensor, and wherein the second sensor data comprises time-of-flight distance data.

9. The method of claim 8, wherein the trained machine learning model takes as further input third sensor data, wherein the third sensor data comprises reflectance data from the time-of-flight sensor.

10. The method of claim 8, wherein the trained machine learning model is an SVM that takes as input a single image from the infrared camera, a single distance measurement from the time-of-flight sensor, and a single reflectance measurement from the time-of-flight sensor.

11. The method of claim 1, further comprising receiving, from an additional sensor on the robotic gripping device, additional sensor data, wherein the trained machine learning model takes as further input the additional sensor data.

12. The method of claim 1, further comprising controlling the robotic gripping device to attempt to grasp the object a second time when the attempt to grasp the object results in a grasp failure.

13. The method of claim 1, wherein the robotic gripping device comprises a plurality of underactuated digits, wherein each underactuated digit has less control inputs than degrees of freedom.

14. The method of claim 1, wherein the first non-contact sensor is a one-dimensional (1D) time-of-flight sensor configured to generate a time-of-flight distance measurement indicative of distance to a nearest object in a direction extending between a plurality of digits of the robotic gripping device.

15. A robot comprising:
a robotic gripping device comprising one or more digits;
a first non-contact sensor positioned outside of the one or more digits of the robotic gripping device;
a second non-contact sensor positioned outside of the one or more digits of the robotic gripping device; and
a control system configured to:
control the robotic gripping device to attempt to grasp an object;
receive, from a first non-contact sensor, first sensor data based on a first sensing modality, wherein the first sensor data is collected after the attempt to grasp the object;
receive, from a second non-contact sensor, second sensor data based on a second sensing modality different from the first sensing modality, wherein the second sensor data is collected after the attempt to grasp the object; and
determine, using a trained machine learning model that takes as input the first sensor data and the second sensor data and outputs a decision of whether the robotic gripping device is currently holding the object after the attempt to grasp the object, whether the robotic gripping device is currently holding the object after the attempt to grasp the object.

16. The robot of claim 15, where the first non-contact sensor is a camera.

17. A method comprising:
controlling one or more digits of a robotic gripping device to attempt to grasp an object;
receiving, from a first non-contact sensor positioned outside of the one or more digits of the robotic gripping device, first sensor data based on a first sensing modality, wherein the first sensor data is collected after the attempt to grasp the object;
receiving, from a second non-contact sensor positioned outside of the one or more digits of the robotic gripping device, second sensor data based on a second sensing modality different from the first sensing modality, wherein the second sensor data is collected after the attempt to grasp the object; and
training, based on the first sensor data, the second sensor data, and a result of the attempt to grasp the object, a machine learning model configured to take input of the first sensing modality and the second sensing modality and output a decision of whether the robotic gripping device is currently holding a given object after the attempt to grasp the given object.

18. The method of claim 17, further comprising training the machine learning model on past grasp attempts by a similar robotic gripping device.

19. The method of claim 17, further comprising training the machine learning model based on simulated grasping events.

20. The method of claim 17, wherein the machine learning model comprises a convolutional neural network (CNN).

* * * * *